(12) United States Patent
Chenard et al.

(10) Patent No.: US 11,391,886 B2
(45) Date of Patent: Jul. 19, 2022

(54) POLARIZATION-MAINTAINING PHOTONIC CRYSTAL FIBER

(71) Applicant: IRflex Corporation, Danville, VA (US)

(72) Inventors: Francois Chenard, Danville, VA (US); Oseas D. Alvarez, Danville, VA (US)

(73) Assignee: IRflex Corporation, Danville, VA (US)

( * ) Notice: Subject to any disclaimer, the term of this patent is extended or adjusted under 35 U.S.C. 154(b) by 94 days.

(21) Appl. No.: 16/911,821

(22) Filed: Jun. 25, 2020

(65) Prior Publication Data
US 2021/0405287 A1 Dec. 30, 2021

(51) Int. Cl.
G02B 6/02 (2006.01)
G02B 6/024 (2006.01)
C03B 37/027 (2006.01)
C03B 37/012 (2006.01)

(52) U.S. Cl.
CPC .... *G02B 6/02323* (2013.01); *C03B 37/01274* (2013.01); *C03B 37/0279* (2013.01); *C03B 37/02709* (2013.01); *G02B 6/024* (2013.01); *G02B 6/02342* (2013.01); *G02B 6/02347* (2013.01); *G02B 6/02357* (2013.01); *C03B 2203/30* (2013.01); *C03B 2203/42* (2013.01)

(58) Field of Classification Search
None
See application file for complete search history.

(56) References Cited

U.S. PATENT DOCUMENTS

| 7,046,887 | B2* | 5/2006 | Kawanishi | G02B 6/105 385/125 |
| 10,261,245 | B2* | 4/2019 | Sulejmani | G02B 6/02109 |
| 2001/0026667 | A1* | 10/2001 | Kawanishi | G02B 6/105 385/11 |
| 2014/0245794 | A1 | 9/2014 | Nguyen | |

FOREIGN PATENT DOCUMENTS

| CN | 102778723 B | * 12/2013 | |
| CN | 103197371 B | * 12/2014 | |
| CN | 105116486 A | * 12/2015 | |
| CN | 107843953 A | * 3/2018 | ......... G02B 6/02347 |
| CN | 113740956 A | * 12/2021 | |
| EP | 1441244 B1 | * 11/2006 | ............... G02B 6/02 |

OTHER PUBLICATIONS

Birks, "Endlessly single-mode photonic crystal fiber", Jul. 1, 1997, 3 pages, Optics Letters vol. 22, No. 13.

(Continued)

*Primary Examiner* — Michelle R Connelly
(74) *Attorney, Agent, or Firm* — Michael Haynes PLC; Michael N. Haynes

(57) ABSTRACT

Certain exemplary embodiments can provide a system, machine, device, manufacture, circuit, and/or composition of matter, and/or a method for activities, that can comprise and/or relate to, a polarization-maintaining photonic crystal fiber comprising an elongated guiding core and/or an elongated photonic crystal cladding surrounding the core, the cladding defining a plurality of holes.

16 Claims, 18 Drawing Sheets

(56) References Cited

OTHER PUBLICATIONS

Ebendorff-Heidepriem, "Extrusion of complex preforms for microstructured optical fibers", Nov. 12, 2007, 7 pages, Optics Express, vol. 15, No. 23.
Hansen, "Highly Birefringent Index-Guiding Photonic Crystal Fibers", Jun. 6, 2001, 3 pages, IEEE Photonics Technology Letters, vol. 13, No. 6.
Kanungo, "Birefringence and large mode area analysis of segmented cladding indexguiding photonic crystal fibers", Feb. 1, 2015, 8 pages, Optical Engineering 54(2).
Knight, "All-silica single-mode optical fiber with photonic crystal cladding", Oct. 1, 1996, 3 pages, Optics Letters, vol. 21, No. 19.
Ortigosa-Blanch, "Highly birefringent photonic crystal fibers", Sep. 15, 2000, 3 pages, Optics Letters, vol. 25, No. 18.
Suzuki, "Optical properties of a low-loss polarization-maintaining photonic crystal fiber", Dec. 17, 2001, 5 pages, Optics Express, vol. 9, No. 13.
Gunasundari, "Silicon Nanowire Embedded Circular Photonic Crystal Fiber for Nonlinear Applications", Jul. 24, 2013, 4 pages, ResearchGate. Proceedings of the "International Conference on Advanced Nanomaterials & Emerging Engineering Technologies" (ICANMEET-20J3).
Islam, "Equiangular spiral photonic crystal fibers with low bending loss", Oct. 1, 2013, 4 pages, Optical Engineering, vol. 52(10) Oct. 2013.
Maji, "Circular Photonic Crystal Fibers: Numerical Analysis of Chromatic Dispersion and Losses", Aug. 8, 2013, 9 pages, Hindawi Publishing Corporation ISRN Optics vol. 2013, Article ID 986924.

\* cited by examiner

POLARIZATION-MAINTAINING PHOTONIC CRYSTAL FIBER

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Certain exemplary embodiments can provide a polarization-maintaining photonic crystal fiber, such as a photonic crystal fiber made from an extruded soft glass preform that utilizes complex asymmetric orthogonal patterns of longitudinal holes with different, e.g., periods and dimensions. The guidance mechanism and design of this high-birefringent fiber can allow the low-loss transmission of highly polarized circular light.

Certain exemplary embodiments can provide an elongated photonic crystal fiber (PCF) made entirely of undoped silica glass with a solid longitudinally-extending core surrounded by a two-dimension array of air holes running along the full length of the fiber and providing confinement and guidance for the light. Such a PCF can be made by stacking an array of longitudinally-extending silica capillaries and/or tubes in a hexagonal arrangement and replacing the central capillary with a solid silica rod to make the solid core, and then fusing the array to form a substantially monolithic PCF. Certain exemplary embodiments of these PCF fibers can guide light only in the fundamental mode regardless of the wavelength, and thus is referred to herein as an endlessly single mode fiber (SMF).

Figure 1:
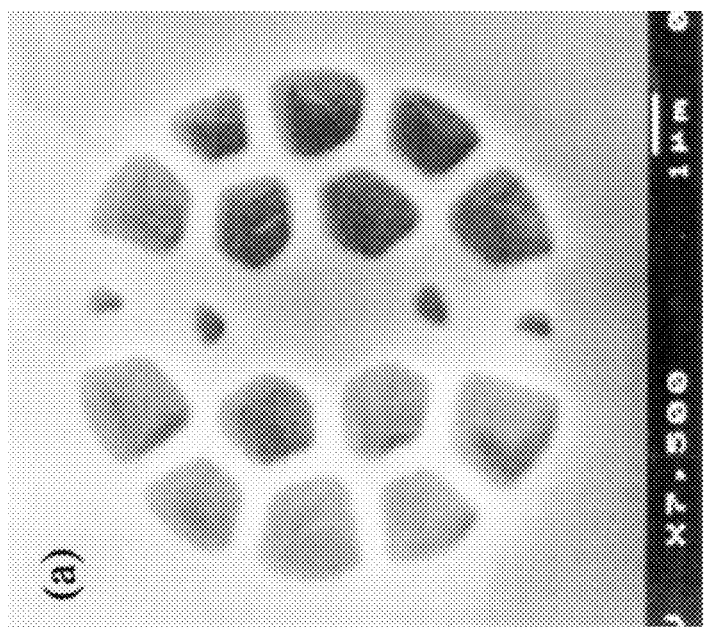
FIG. 1 is a cross-section view showing a structure of a polarization-maintaining fiber.
Figure 2:
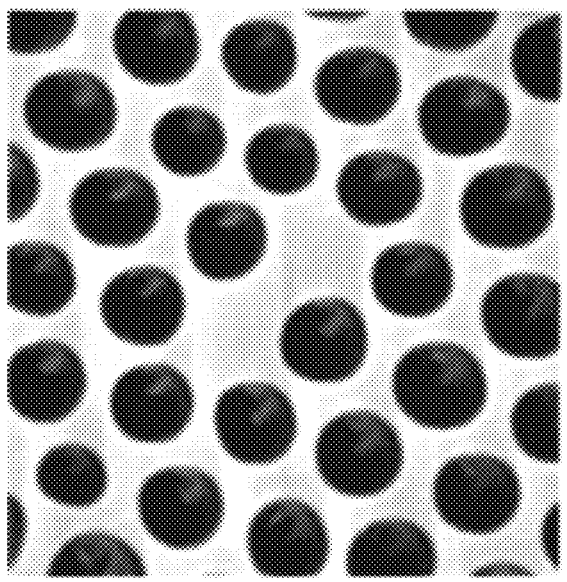
FIG. 2 is a cross-section view showing a structure of a polarization-maintaining fiber.
Figure 3:
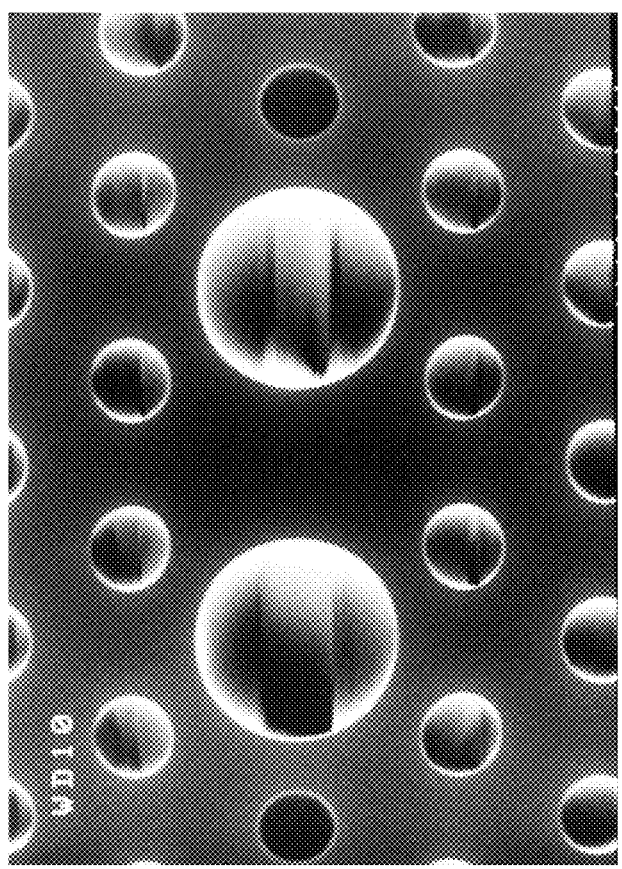
FIG. 3 is a cross-section view showing a structure of a polarization-maintaining fiber.

Certain exemplary embodiments can provide a low-loss and highly birefringent polarization-maintaining photonic crystal fiber (PM-PCF) that utilizes asymmetry in a hexagonal pattern of holes around the solid core. FIG. 1 shows an example of PM-PCF where, when viewed in longitudinal cross-section, a line of capillaries with thicker walls (smaller air holes) is positioned across the core to produce different orthogonal air hole sizes in the cladding. Another PM-PCF, shown in FIG. 2, can be made by replacing two neighboring capillaries in the center with two silica rods to form an asymmetric core. Another PM-PCF (see FIG. 3), with two enlarged central air holes next to the solid core, can produce a large birefringence. When tested, the loss for this PM-PCF was 1.3 dB/km and the modal birefringence was $1.4 \times 10^{-3}$, which was one order of magnitude larger than that ($\sim 5 \times 10^{-4}$) of PM fibers produced by stress in the core region. Other PM-PCF variations can be designed similarly using at least a part of an array of large holes orthogonal to an array of smaller holes.

Stacking, packing, and/or bundling a hexagonal array of glass capillaries and/or tubes with different wall thicknesses (which produce differently-sized air holes) and/or replacing one or two central capillaries with glass rods, and then fusing the stack/pack/bundle, can produce certain exemplary embodiments of PM-PCFs. However, the hexagonal stacking technique to design and fabricate the PM-PCF can allow only one periodicity between capillaries and rods. This is one reason why certain exemplary PM-PCFs can have an elongated and somewhat elliptical core when viewed in longitudinal cross-section. Yet the core ellipticity can increase the difficulty of coupling a polarized laser beam into the PM-PCF because the light spatial distribution from a high beam quality laser can be circular. Thus, the core's elliptical nature can necessitate that, to be well-coupled into a PM-PCF, the laser's beam be focused on the smallest width of the core's two orthogonal cross-sectional elliptical axes, which can increase the coupling loss because of the mismatch with the guided mode and/or can limit the amount of power coupled in the PM-PCF. Also, the elliptical output beam from certain exemplary PM-PCFs can have astigmatism, similar to the elliptical output beam from semiconductor lasers, which can be difficult to perfectly collimate simultaneously for both axes with low beam divergence using a single lens.

Glass billet extrusion is a promising alternative approach to the stacking technique for making complex PCF preforms in a single step. An exemplary extruded preform for PCF with large numbers of holes can be a 3-ring bismuth glass preform. A special die design along with advanced extrusion process controls can enable the fabrication of the 3-ring bismuth PCF with minimum loss of 1.2 dB/m at 1100 nm.

Figure 4A:
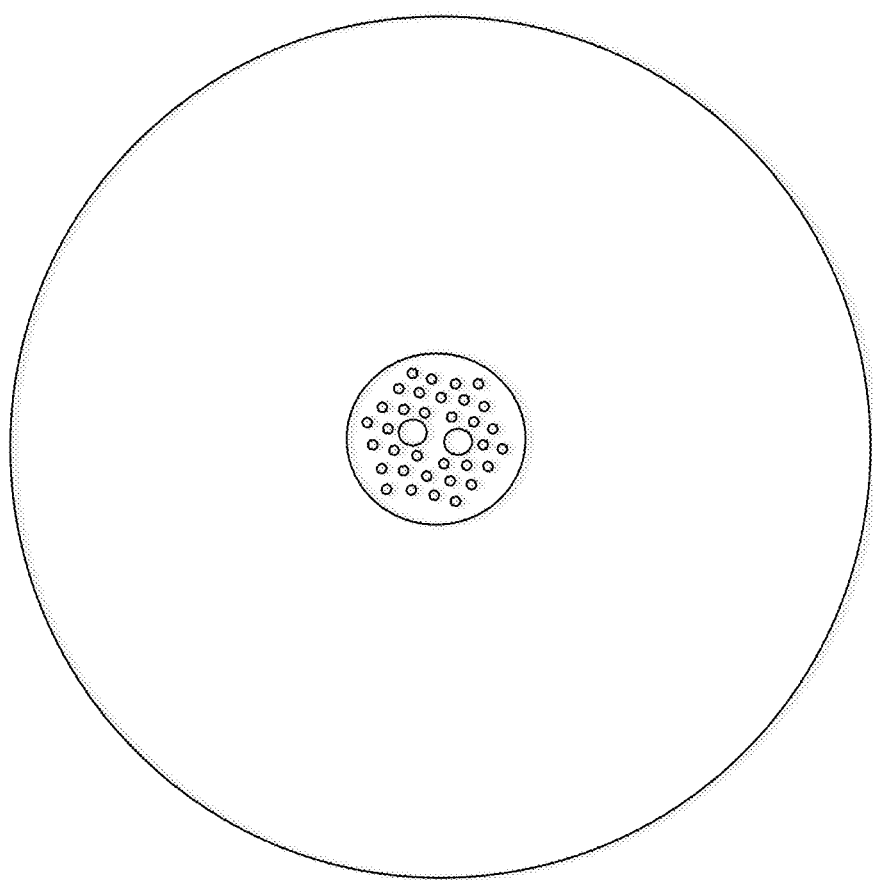
FIGS. 4A and 4B are the cross-section views of a polarization-maintaining fiber made by extrusion showing the microscope picture of the structures and the infrared camera picture of the transmitted light's near field.
Figure 4B:
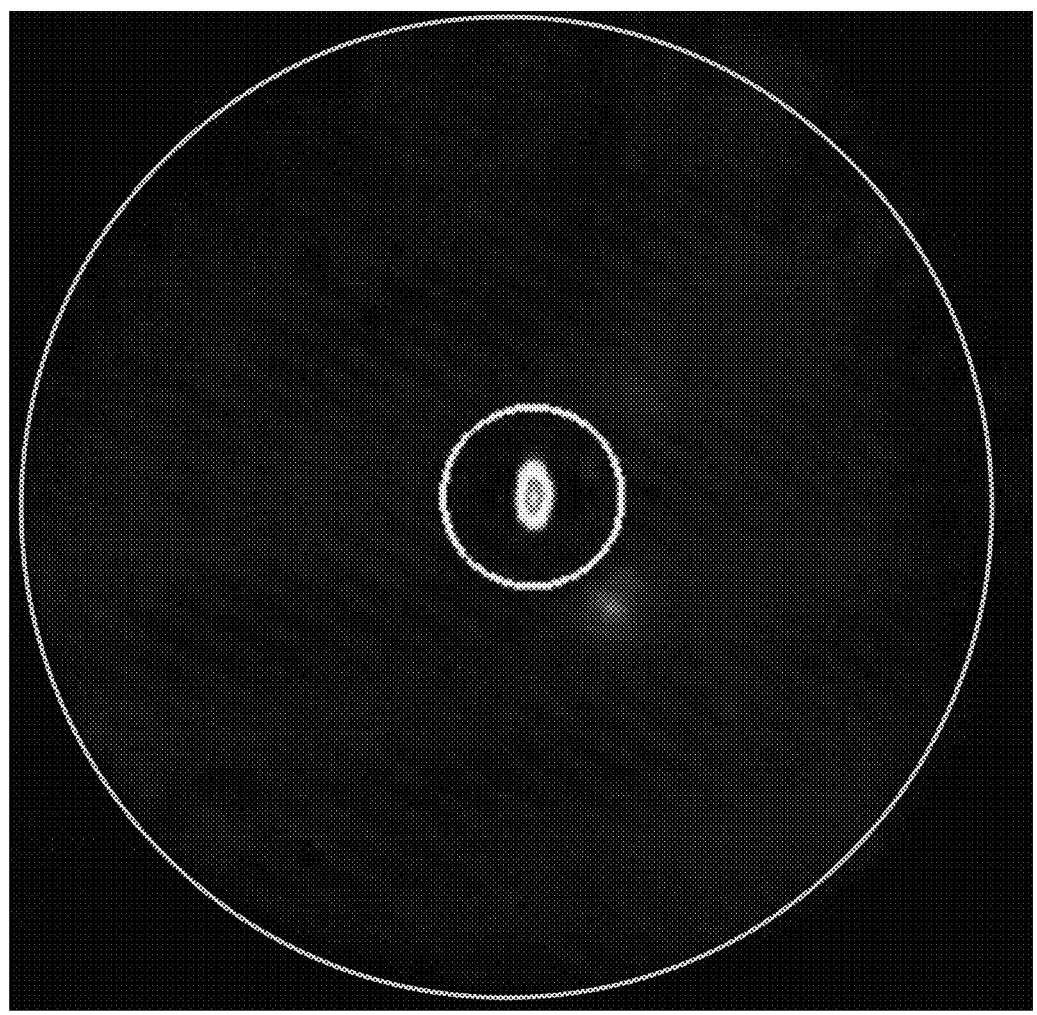

Chalcogenide glass ($As_2S_3$) can be used to extrude a preform and/or draw a PM-PCF fiber with two enlarged central air holes next to the solid core. FIG. 4A shows a microscope picture of the chalcogenide PM-PCF. The extruded PM-PCF area is visible in the center of the fiber. FIG. 4B shows the infrared camera picture of the transmitted light's near field at 2-micron wavelength. The fiber diameter and extruded PM-PCF area are indicated with two circles. Yet for this exemplary embodiment, the guided beam is highly elliptical.

Certain exemplary embodiments can provide a PM-PCF with complex patterns of air holes. Those patterns can include holes of different shapes, positions, orientations, dimensions, and/or periods (distances between centerpoints/ longitudinal axes of adjacent holes). Certain exemplary embodiments can provide a method of producing such a fiber.

Certain exemplary embodiments can provide a single mode polarization-maintaining photonic crystal fiber (PM-PCF) made of a single glass material with an elongated guiding core that defines the longitudinal axis of the PM-PCF. The longitudinal cross-section of the elongated co-axial photonic crystal cladding surrounding the core can be divided into a plurality (such as four) of cross-sectional areas that exist entirely within the cross-sectional plane, entirely within the cladding, and entirely outside the core, those areas defined by Cartesian vertical (y) and horizontal (x) axes, those axes orthogonal to each other and to the longitudinal axis (i.e., the "fiber axis" or "z-axis"), those x- and y-axes defining a Cartesian origin at their intersection that falls on the z-axis.

A first selected pair of these areas can be opposed to each other with respect to a first axis of symmetry, i.e., can be located symmetrically on either side of the first axis, which can be the x-axis or the y-axis. Each of the first pair of areas can circumscribe, define, and/or contain a group of elongated air holes in the cladding, each of those holes defining a centerpoint and a longitudinal axis that extends parallel to the fiber axis. The holes of one area of the first pair of areas are symmetric, with respect to the first axis, with those of the other area of the first pair. From the perspective of the cross-sectional x-y Cartesian plane, the holes can have any of a variety of attributes, e.g., shapes, positions, orientations, dimensions, and/or periods (i.e., centerpoint distances) that fulfill the intended function of the holes as described herein—e.g., enable a high-birefringent fiber that provides low-loss transmission of highly polarized circular light. For example, the shape of a hole can be generally curvilinear in shape, such as a circle or a non-circle, such as an oval (which generally can include a shape that is substantially in the form of an obround, ellipse, limacon, cardioid, Cartesian oval, and/or Cassini oval, etc.), crescent, semi-circle, sector, segment, lens, annulus, etc.; can be a simple, closed, non-circular, curvilinear and/or partially curvilinear shape, e.g., shaped substantially like the letter D or P; and/or generally shaped as a polygon, such as a triangle, equilateral triangle, isosceles triangle, right triangle, scalene triangle, quadrilateral, trapezoid, parallelogram, square, rhombus, deltoid, rectangle, pentagon, pentagram (star), hexagon, regular polygon, irregular polygon, etc., or as any substantially closed shape. Any hole of an area can be positioned/located anywhere within the area. Any hole can be rotated to any degree with respect to its longitudinal axis. Any hole can have any contextually appropriate x and/or y dimensions, i.e., dimensions that maintain the intended function of the hole and keep the hole within the area. The period between any arbitrarily chosen adjacent holes within the area can differ from that of any other arbitrarily chosen adjacent holes within the area. The longitudinally extending inside surface(s) of each of the holes can present one or more surface effects, such as a surface finish/roughness. Just as with the other hole attributes, a surface effect of one hole can differ from that of another. For a hole having a polygonal cross-sectional shape, a surface effect for one inside surface can differ from that of another inside surface of that same hole.

Similarly, a second selected pair of areas (of the four areas) can be opposed to each other with respect to a second axis of symmetry, i.e., can be located symmetrically on either side of the second axis, which can be the x-axis or the y-axis, whichever axis is not the first axis of symmetry. Each of the second pair of areas can circumscribe, define, and/or contain a group of elongated holes in the cladding, each of those holes defining a centerpoint and a longitudinal axis that extends parallel to the fiber axis. The holes of one area of the second pair are symmetric, with respect to the second axis, with those of the other area of the second pair. Just as described above for the holes of the first pair of areas, from the perspective of the cross-sectional x-y Cartesian plane, the holes of the second pair of areas can have any of a variety of attributes, each of those attributes having any of the qualities described above, and any of those attributes or qualities can be different from those of the holes of the first pair of areas.

The birefringence in the PM-PCF can be generated by the asymmetry of the holes of a first area with respect to those of an adjacent and/or x-y orthogonal second area (i.e., the second area being single-fold symmetrical (i.e., symmetrical when rotated about a single axis) or double-fold symmetrical (i.e., symmetrical when rotated about the x axis and then the y axis (or vice versa)) to the first area.

Certain exemplary embodiments can include the design of a PM-PCF where the holes of the first pair of areas are positioned along at least a portion of a perimeter of an imaginable closed curvilinear shape having a centroid that is positioned precisely or approximately on the fiber's longitudinal axis, those holes potentially having different selected shapes, positions, orientations, dimensions, and/or periods with respect to one another and/or those of the second pair of areas, to define a substantially circular core.

Certain exemplary embodiments can provide a PM-PCF with a photonic crystal cladding structure having an outside (with respect to the z-axis) layer of holes, potentially having different selected hole attributes, e.g., shapes, positions, orientations, dimensions, periods, and/or surface effects, etc., with respect to one another and/or those of a second layer/orbit of hole, to contain the leaky modes and/or minimize the transmission loss.

Certain exemplary embodiments can use glass billet extrusion to provide the preform with complex arrangement of air holes to draw the PM-PCF. The extrusion die can be designed with a series of pins with various pin attributes, e.g., different selected shapes, positions, orientations, dimensions, periods, and/or outside surface effects, that are configured to produce the preform with a desired core, photonic crystal cladding, and/or jacket. The extruded photonic crystal cladding can be made of adjacent, asymmetric, and/or orthogonal groups of holes with selected and/or predetermined various, distinct, and/or differing hole attributes, e.g., shapes, positions, orientations, dimensions, periods, and/or inside surface effects, etc.

An exemplary polarization-maintaining photonic crystal fiber (PM-PCF) can be designed and/or made from an extruded soft glass preform that utilizes asymmetric orthogonal patterns of holes with different hole attributes. The guidance mechanism and/or design of this high-birefringent fiber can allow the low-loss transmission of a polarized circular beam.

Figure 5A:
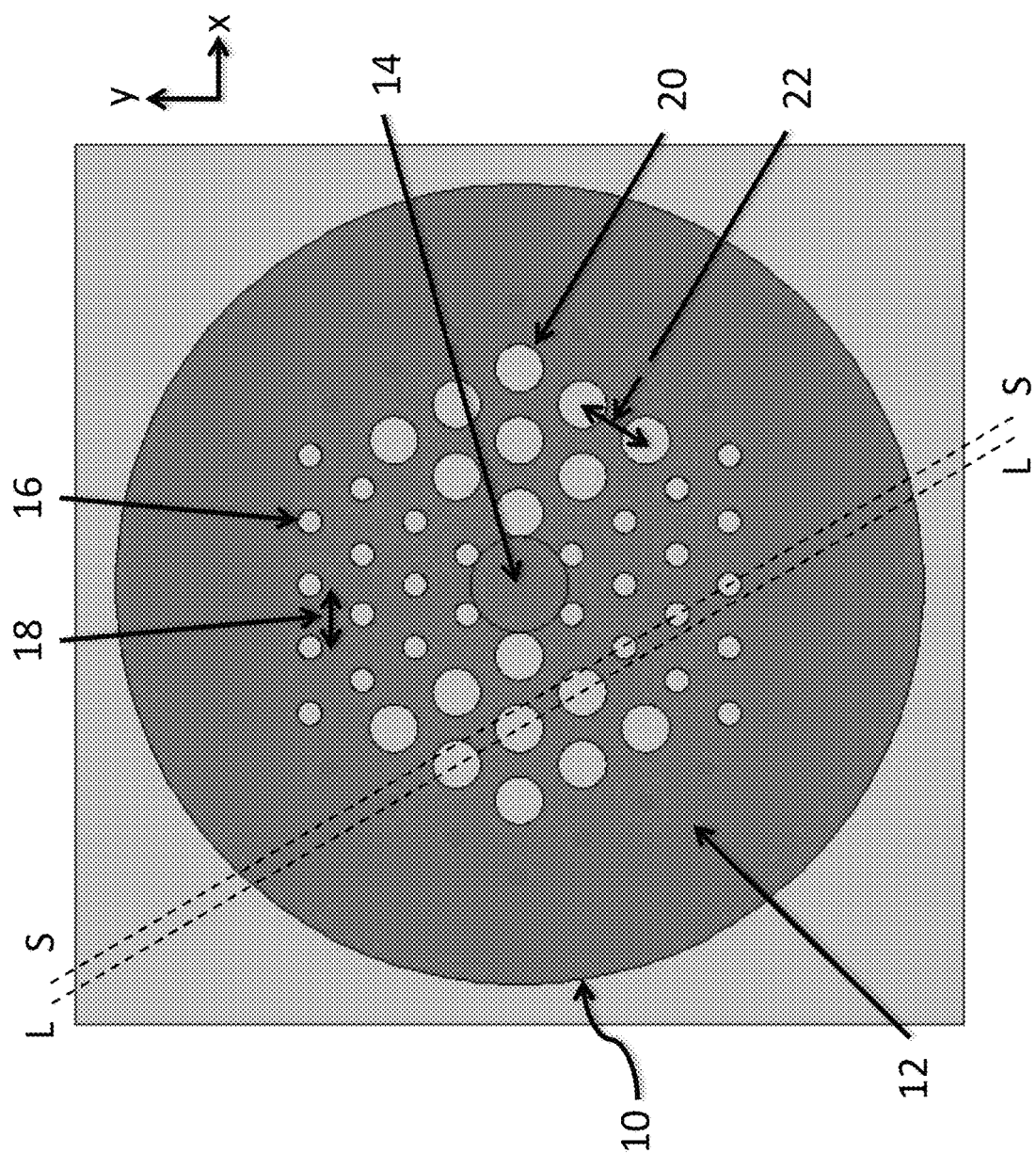
FIGS. 5A, 5B, 5C, 5D, and 5E are cross-sectional views showing various polarization-maintaining fibers.

Certain exemplary embodiments can have two adjacent, asymmetric, and/or orthogonal patterns of holes with different hole attributes, e.g., shapes, positions, orientations, dimensions, and/or periods. The different hole attributes can create the birefringence. For example, in order to have high birefringence and a circular core, the periods of the orthogonal patterns of holes can be changed. FIG. 5A illustrates an exemplary embodiment of a PM-PCF 10, which can be made of a single glass material with a jacket 12 that can have small holes 16 clustered in two groups or areas, one located above the x-axis, and the other below the x-axis, as well as large holes 20 clustered in a different pair of groups or area, one located to the left of the y-axis, the other to the right of the y-axis. As shown, the period 18 of small holes 16 (i.e., the center-to-center distance between adjacent holes) is smaller than the period 22 of the large holes 20. The smaller period 18 moves the pattern of the small holes 16 closer to the center/origin in order to define a more circular core 14. Note that due to the difference between periods 18 and 22 and/or the difference between the diameters of holes 16 and 20, a line S-S that intersects the centerpoints/longitudinal axes of each of multiple diagonally-adjacent small holes 16 is parallel with, but offset from, an adjacent line L-L that intersects the centerpoints of multiple diagonally-adjacent large holes 20.

Figure 5B:
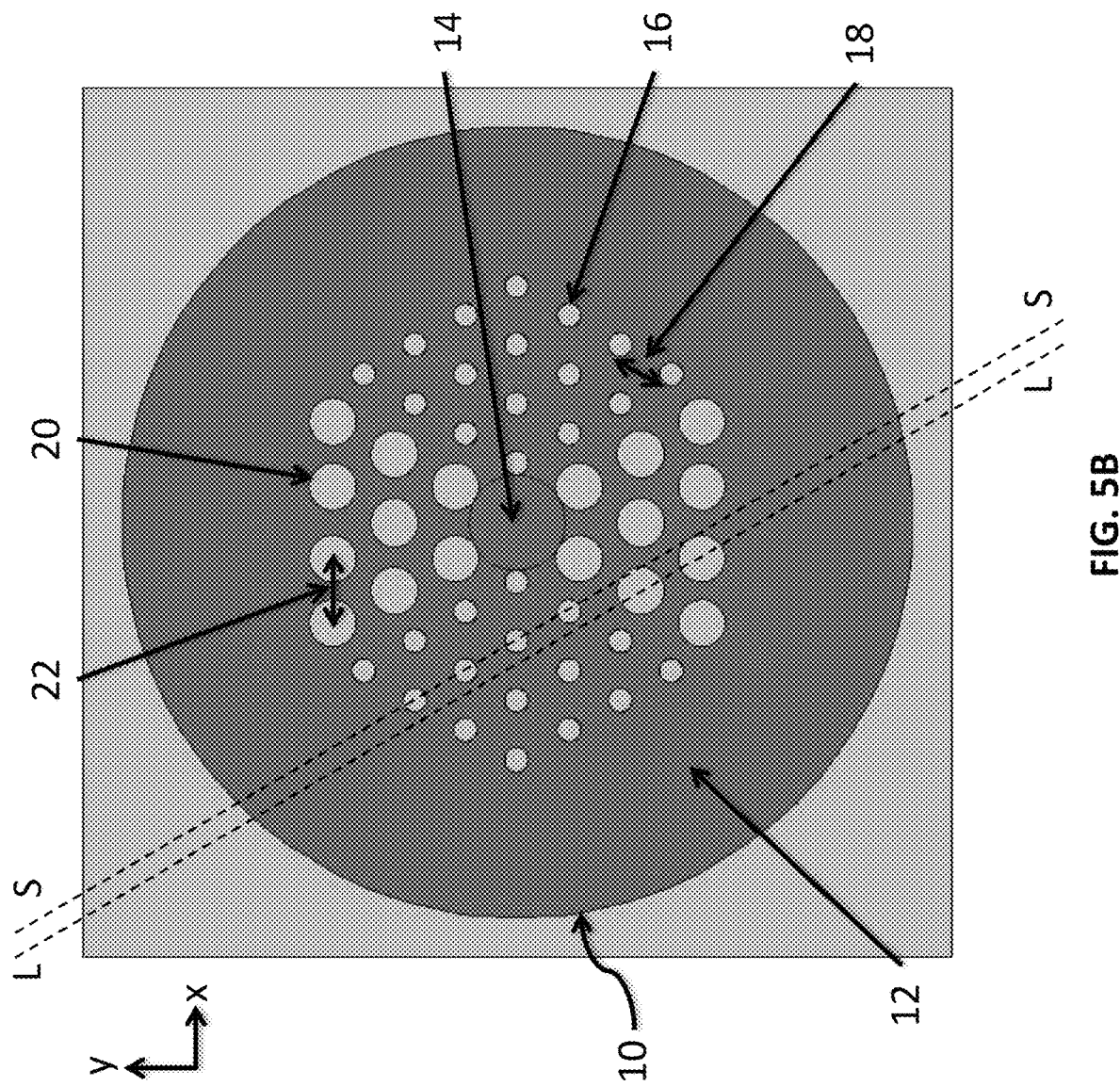

FIG. 5B illustrates an exemplary embodiment of another PM-PCF 10 but with the two groups of small holes 16 clustered on either side of the y-axis and the two groups of large holes 20 clustered on either side of the x-axis. In this embodiment, the period 18 of the small holes 16 is smaller than the period 22 of the large holes 20. The larger period 22 moves the pattern of the large holes 20 away from the center/origin in order to create a circular core 14. As with FIG. 5A, note that due to the difference between periods 18 and 22 and/or the difference between the diameters of holes 16 and 20, a line S-S that intersects the centerpoints of multiple diagonally-adjacent small holes 16 is parallel with, but offset from, an adjacent line L-L that intersects the centerpoints of multiple diagonally-adjacent large holes 20.

The offset hole design and its circularization of the guided mode in FIG. 5A and FIG. 5B need not form birefringence caused by a highly elliptical core region. Instead the birefringence can come from the electric field penetration into two regions with distinct effective refractive indices. That is, the effective refractive index in the cladding can be adjusted by, for example, changing hole attributes, such as the diameter-to-period ratio for the small holes and the diameter-to-period ratio for the large holes. The large hole diameter-to-period ratio can produce a lower effective refractive index because of the higher air fill fraction.

Simulations of the PM-PCFs shown in FIG. 5A and FIG. 5B were made with the same core diameter, small hole diameter-to-period ratio, and large hole diameter-to-period ratio. The only difference is that FIG. 5A has the large hole ratio defined by two groups of large holes that are separated from each other by the y-axis and has the small hole ratio defined by two groups of small holes that are separated from each other by the x-axis, while FIG. 5B reverses (or rotates by 90 degrees) that arrangement of groups. The results of those simulations show that the PM-PCF in FIG. 5B gives better optical performances: higher birefringence and lower leakage loss. The higher birefringence and lower loss can be due to the core region being surrounded by a first ring of holes in which 4 are of large diameter and only 2 of smaller diameter.

Further simulations of the PM-PCF in FIG. 5B showed that for a given small hole diameter-to-period ratio measured in the x-direction, the leakage loss decreases with increasing large hole diameter-to-period ratios measured in the y-direction. Similarly, larger small hole diameter-to-period ratios measured in the x-direction also resulted in lower leakage losses. This comes from the fact that the larger the small hole diameter-to-period ratio the larger the effective numerical aperture resulting in increased light confinement. The birefringence of the PM-PCF is observed to increase as the difference between the large hole diameter-to-period ratio and the small hole diameter-to-period ratio increases. This is understood to be because the larger the index difference in each orthogonal axis the larger the difference in the mode effective index polarized along those axes.

Another interesting result is that as the core diameter of the PM-PCF increases, the birefringence decreases. The increase in core diameter can result in a smaller interaction with the surrounding photonic crystal region, which can be responsible for the birefringence properties of the fiber. The reduced interaction with the photonic crystal region can decrease the effective mode index of the fundamental mode of the fiber for both polarizations reducing the birefringence but increasing core fill fraction (how much light is in the core) and circularity. This shows an important potential trade off in which we can have a large core to support high power throughputs but with a reduced birefringence, or we can have a small core to support lower power injection but with a large birefringence.

Figure 5C:
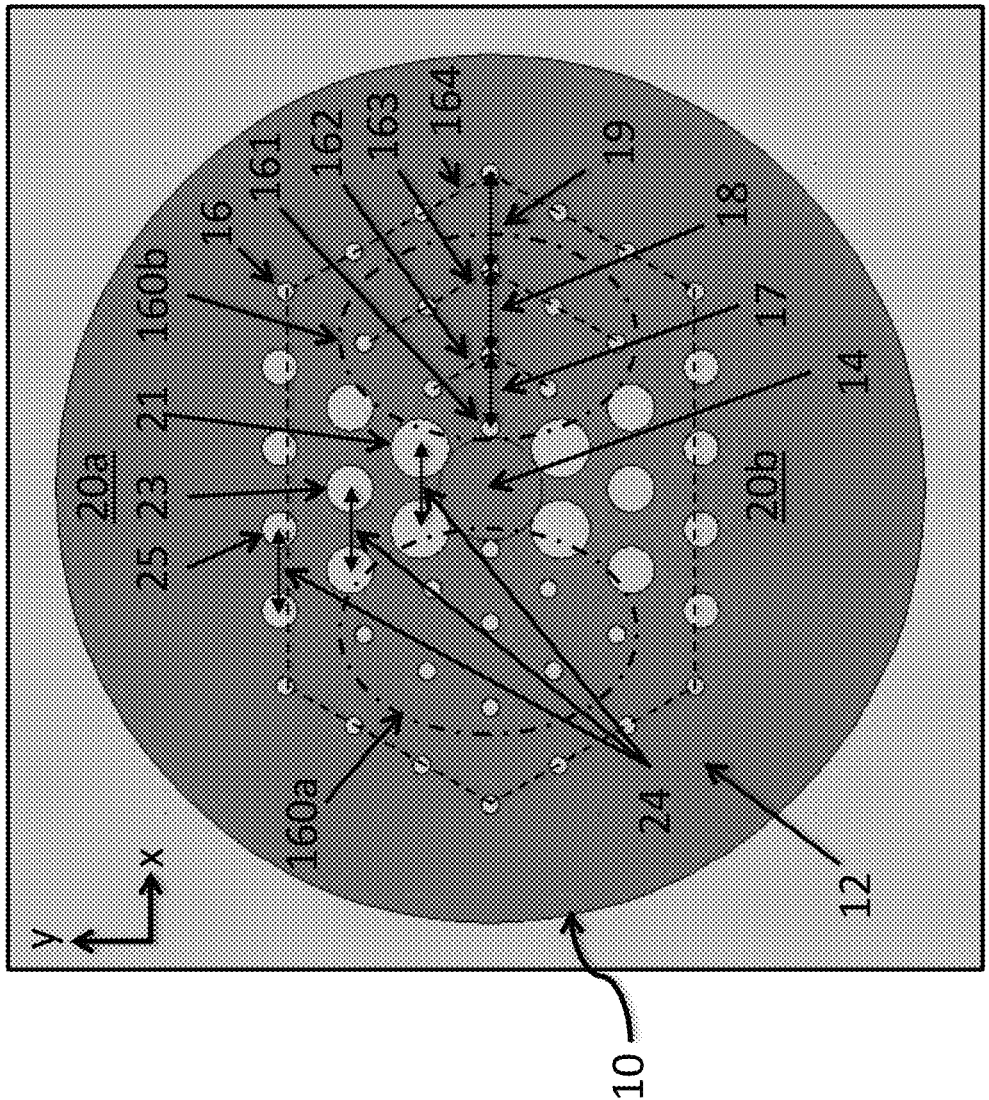

FIG. 5C illustrates an exemplary embodiment of another PM-PCF 10 having two symmetrical groups of small holes 16 clustered on either side of the y-axis, i.e., each hole to the right of the y-axis has a symmetrical counterpart on the left side of the y-axis. A portion of the small holes 16 located to the left of the y-axis are being treated in this figure as members of group 160a, and likewise for group 160b, its symmetrical counterpart. Within group 160b is one or more holes 16 that define a core-surrounding first layer 161 (where a "layer" need not completely surround core 14, but instead can define a portion (such as one or more sides) of a perimeter of a polygon and/or other closed shape that can be imagined as surrounding core 14). Looking radially outward from the core, layer 161 is separated from a second layer 162 by a period 17. Likewise, second layer 162 is separated from a third layer 163 by a period 18, except that period 18 is different than period 17. Located outside of groups 160a, 160b are pluralities of holes 16 that define a fourth layer 164 that is separated from third layer 163 by a period 19 that is different from periods 17 and 18.

As shown, PM-PCF 10 also has two symmetrical groups 20a, 20b of larger holes with the same period 24 clustered on either side of the x-axis, i.e., each hole to the top of the x-axis has a symmetrical counterpart on the bottom side of the x-axis. Group 20a (i.e., the collection of larger holes located above the x-axis) includes a first layer of holes next to core 14 with a first dimension 21. Looking radially outward from core 14 is a second layer of holes with a dimension 23 that is different than dimension 21, and then a third layer of holes with a dimension 25 that is different than dimensions 21 and 23. In this embodiment, the effective refractive index along the x-axis gradually increases as we move away from the core because the period between the layers of similar holes gradually increases. Likewise, the effective index along the y-axis gradually increases as we look radially outward from the core because, although the period 24 is constant between the holes of a given layer and/or between layers, the dimensions of the holes gradually decrease.

More exemplary embodiments of other PM-PCFs include multiple combinations of periods and dimensions of holes. The two groups of small holes clustered on either side of the y-axis can have various periods and dimensions. Also, the two groups of large holes clustered on either side of the x-axis can have various periods and dimensions. The difference in the various periods and dimensions of the two groups of small holes clustered on either side of the y-axis and the various periods and dimensions of the two groups of large holes clustered on either side of the x-axis can be configured to generate a predetermined birefringence in the polarization-maintaining photonic crystal fiber.

Figure 5D:
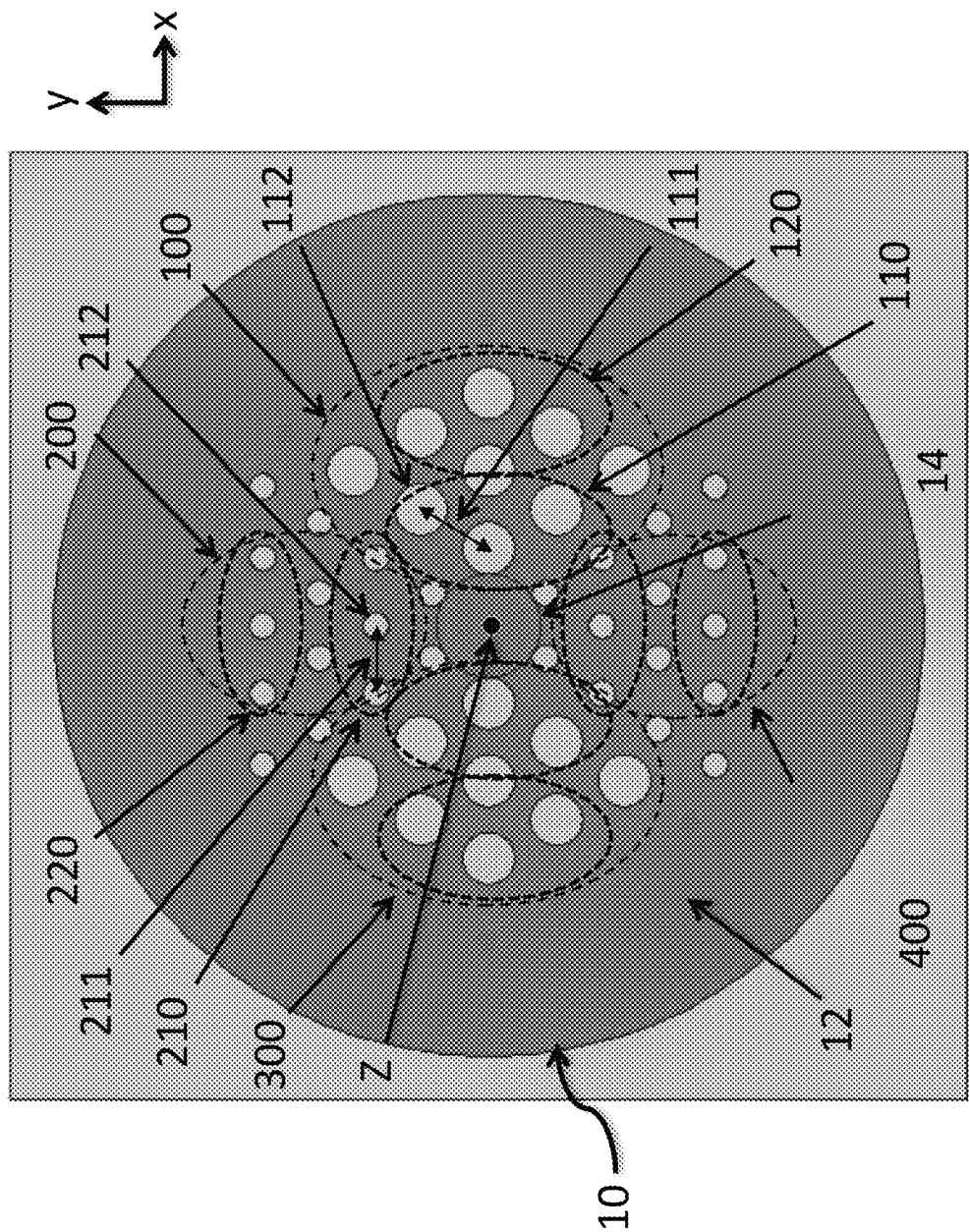
Figure 5E:
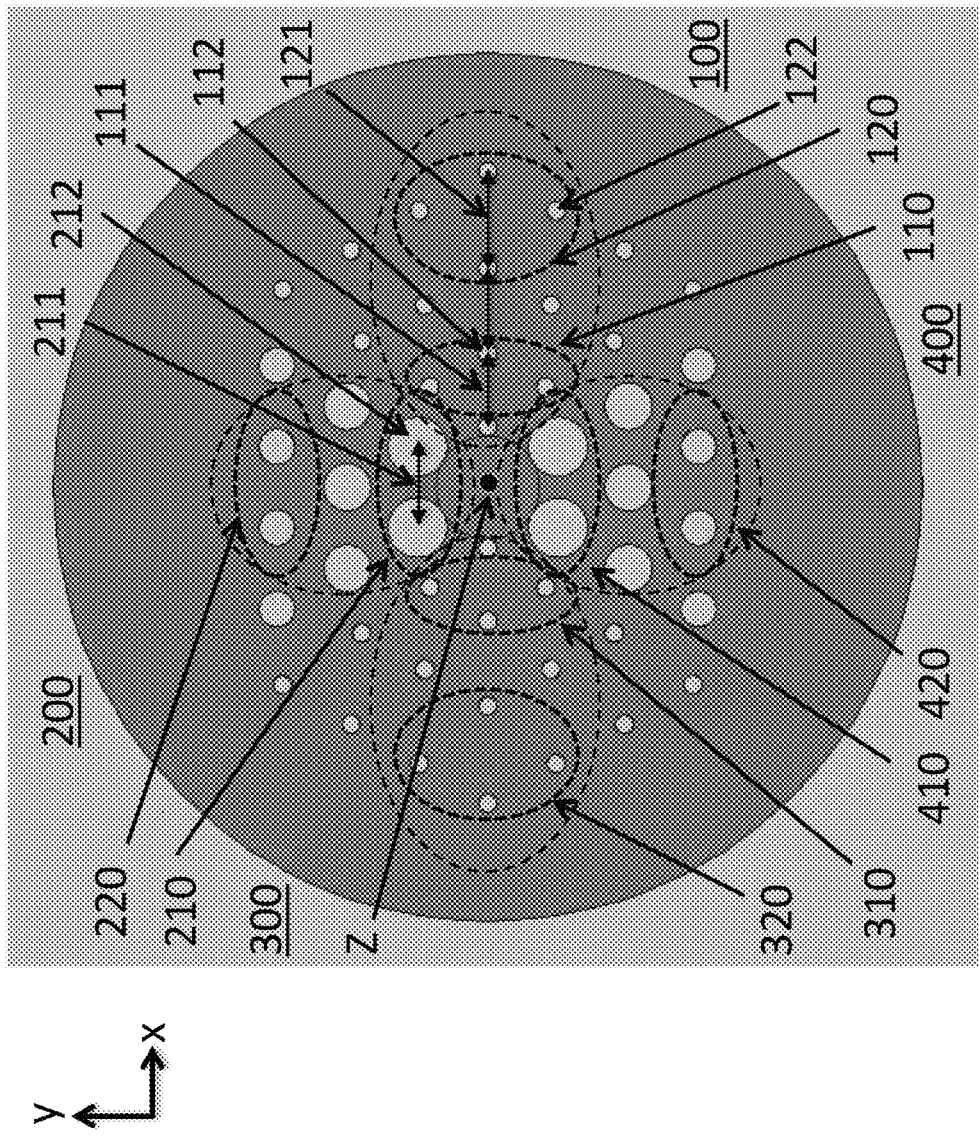

Each of FIGS. 5D and 5E illustrates a longitudinal cross-section of an exemplary embodiment of a polarization-maintaining photonic crystal fiber 10 comprising:
an elongated guiding core 14; and
an elongated photonic crystal cladding 12 surrounding the core 14;
wherein:
a cross-sectional area of the fiber 10 taken orthogonally to a fiber longitudinal axis Z of the fiber can be characterized by an x-axis and a y-axis, the x-axis orthogonal to the y-axis, the x-axis and the y-axis orthogonal to the fiber longitudinal axis Z;
the cross-sectional area of the fiber can define a collection of groups of elongated holes located in the cladding, each hole in the collection having a hole longitudinal axis that is parallel to the fiber longitudinal axis, the collection of groups comprising a first group 100, a second group 200, a third group 300, and a fourth group 400, the first group 100 and third group 300 defining an opposing first pair, the second group 200 and fourth group 400 defining an opposing second pair;
the first group 100 and the third group 300 can be symmetrical with each other with respect to the y-axis;
a first plurality 110 of the holes in the first group 100 can have a first period 111 and a first common dimension 112;
the second group 200 and the fourth group 400 can be symmetrical with each other with respect to the x-axis;
a first plurality 210 of the holes in the second group 200 can have a first period 211 and a first common dimension 212; and/or a difference in the first period 111 and the first dimension 112 of the first plurality 110 of the holes in the first group 100 with respect to the first period 211 and the first common dimension 212 of the first plurality 210 of the holes in the second group 200 can be configured to generate a predetermined birefringence in the polarization-maintaining photonic crystal fiber 10.

FIG. 5E also illustrates that a second plurality 120 of holes in the first group 100 have a second period 121 and/or a second common dimension, the first period 111 of the first group 110 differing from the second period 121 of the first group 100 and/or the first common dimension of the first group 100 differing from the second common dimension of the first group 100.

The photonic crystal structure can be inherently leaky as outside of the last ring of holes the glass can have the same high refractive index as the core so light confined to the core can leak towards this region. The simplest solution can be to add extra rings of holes to the photonic crystal structure, but this can come at the cost of adding fabrication complexity and it does not necessarily eliminate leakage losses.

Figure 6:
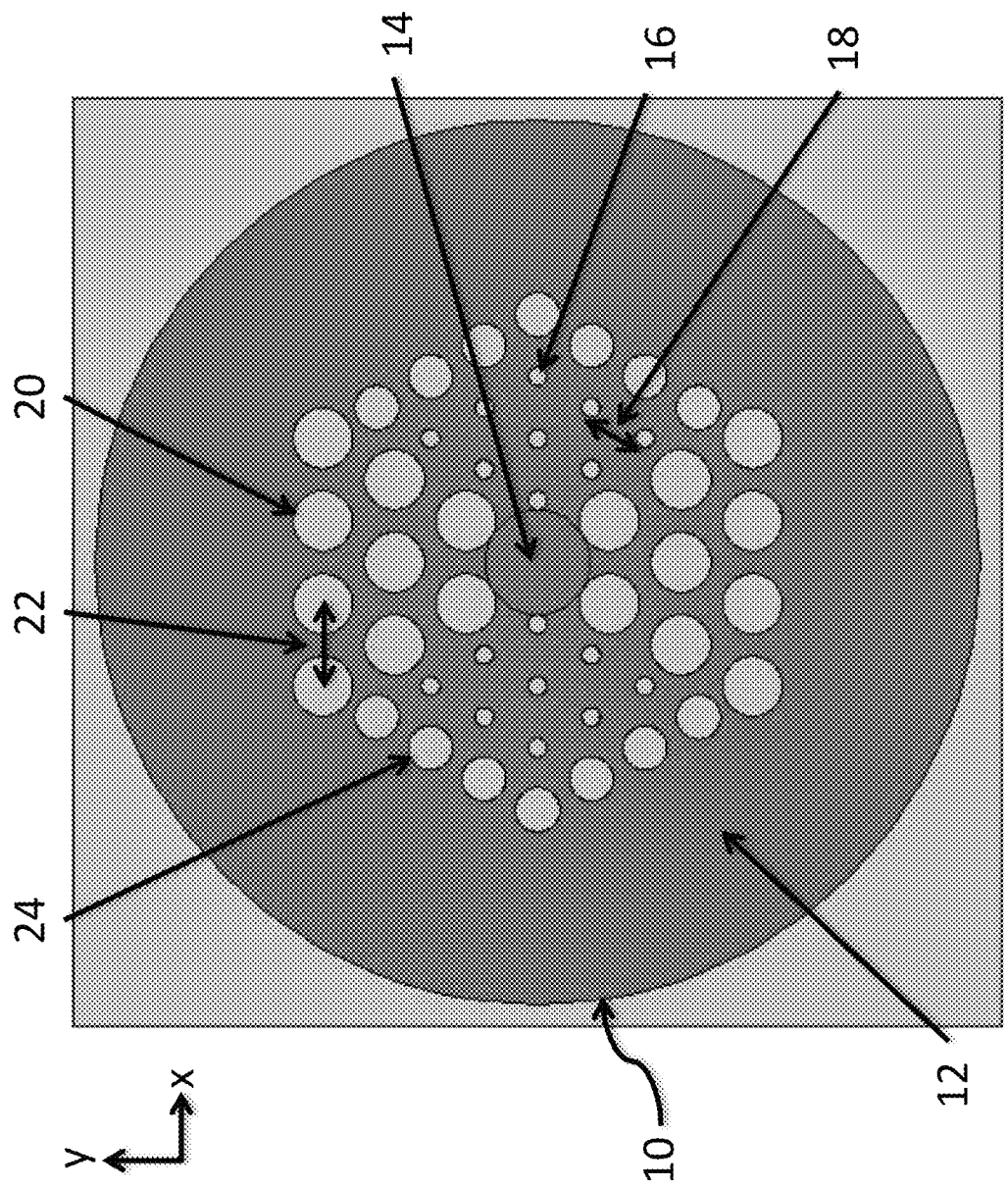
FIG. 6 is a cross-section view showing a polarization-maintaining fiber.

Simulations were done to explore ways of reducing the leakage losses. We found that adding an isolation layer with large or medium-sized diameter holes surrounding the photonic crystal structure decreases the leakage loss dramatically without affecting the birefringence of the fiber. FIG. 6 illustrates an exemplary embodiment of PM-PCF 10 that is similar to the exemplary embodiment of PM-PCF 10 shown in FIG. 5B except with a partial isolation layer/orbit about the core, that partial isolation layer defined primarily by medium diameter holes 24 that replace the last layer (i.e., outermost orbit about the core) of small holes 16. Simulations of the PM-PCF in FIG. 6 shows that the light is very well confined by the large holes 20 in the y-direction, apparently because of the high diameter-to-period ratio, and the added layer of medium holes 24 effectively reduces the leaky loss in the x-direction to negligible value. The birefringence of the PM-PCFs in FIG. 5B and FIG. 6 is the same.

Figure 7:
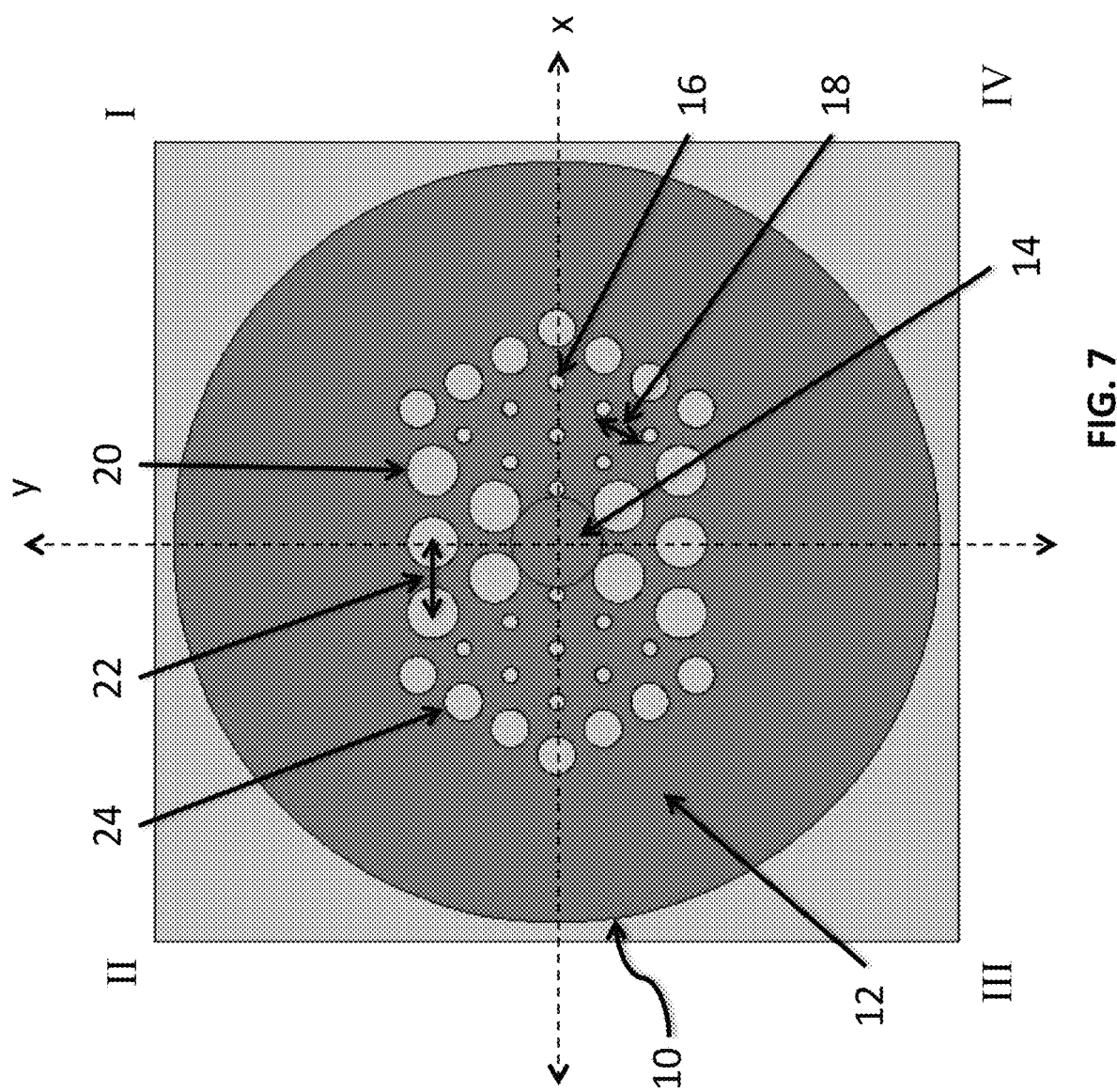
FIG. 7 is a cross-section view showing a polarization-maintaining fiber.

The previous observations helped us design another embodiment of a PM-PCF 10, illustrated in FIG. 7, with only 2 layers of large holes 20 with period 22 measured in the x-direction and 3 layers of small holes 16 with period 18 and a partial isolation layer of medium holes 24. The PM-PCF design in FIG. 7 has the same birefringence and negligible leakage loss as for the PM-PCF design in FIG. 6 but most importantly, due to the reduction in the number of holes, the complexity of the structure is also reduced, which can simplify the fabrication process. For reference, the x-axis and y-axis in FIG. 7 combine to define four zones, sub-areas, and/or quadrants (I, II, III, and IV), where the holes defined and/or contained in quadrant I are single-fold symmetrical (i.e., symmetrical when rotated about a single axis) with the holes of quadrants II and IV, and double-fold symmetrical (i.e., symmetrical when rotated about the x axis and then the y axis (or vice versa)) with those of quadrant III.

Example 1

Chalcogenide glass, $As_2S_3$, was used for simulations with the PM-PCF design illustrated in FIG. 7 for the mid-wave infrared spectrum (2-6 micron) transmission with low loss (<200 dB/m) and high birefringence ($\sim 10^{-4}$). The PM-PCF has a large circular core 14 diameter of 11.9 μm capable of delivering high power laser light. The chalcogenide-based single mode PM-PCF design consist of two symmetrical regions located on either side of the y-axis, each presenting 3 layers of small holes 16 with diameter of 2.1 μm, period 18 of 7 μm, ratio of 0.3, and a partial isolation layer with hole 24 diameter of 5 μm, and two symmetrical regions located on either side of the x-axis, each presenting 2 layers of large holes 20 having a diameter of 6.8 μm, period 22 of 9.35 μm, ratio of 0.7273. This PM-PCF design is optimized to have a large core with large mode area for optimization of its power handling at all wavelengths of interest, low loss propagation, single mode guidance in the wavelength range from 2 μm to 6 μm, high birefringence, and improved circularity.

The simulations of the PM-PCF reveal negligible losses in the 2 μm to 6 μm wavelength range <0.05 dB/km. The core fill fraction, how much light is in the core 14, decreases at longer wavelength but the design keeps more than 95.37% of the power within the core region for all wavelengths. Lastly, the birefringence increases with wavelength going from $0.2 \times 10^{-4}$ up to $6.2 \times 10^{-4}$. The circularity was improved (short radius/long radius >0.98) providing a fairly circular output beam. The y-dimension is slightly longer than the x-dimension as the mode field distributes itself between the air holes even under very high core confinement conditions. Table 1 summarizes the optical performances of the chalcogenide PM-PCF design in FIG. 7 with the above dimensions.

TABLE 1

Optical performance for the chalcogenide PM-PCF in design in FIG. 7 according to example 1.

| Wavelength | Birefringence | Fill fraction | Loss (dB/km) | Circularity |
|---|---|---|---|---|
| 2 μm | $0.2 \times 10^{-4}$ | 97.58% | $\sim 6.08 \times 10^{-5}$ | 0.9837 |
| 3 μm | $0.8 \times 10^{-4}$ | 97.18% | $\sim 3.21 \times 10^{-4}$ | — |
| 4 μm | $1.8 \times 10^{-4}$ | 96.69% | $\sim 1.51 \times 10^{-3}$ | 0.9854 |

TABLE 1-continued

Optical performance for the chalcogenide PM-PCF in design in FIG. 7 according to example 1.

| Wavelength | Birefringence | Fill fraction | Loss (dB/km) | Circularity |
|---|---|---|---|---|
| 5 μm | $3.6 \times 10^{-4}$ | 96.10% | $\sim 6.99 \times 10^{-3}$ | — |
| 6 μm | $6.2 \times 10^{-4}$ | 95.37% | 0.049 | 0.9885 |

Figure 8:
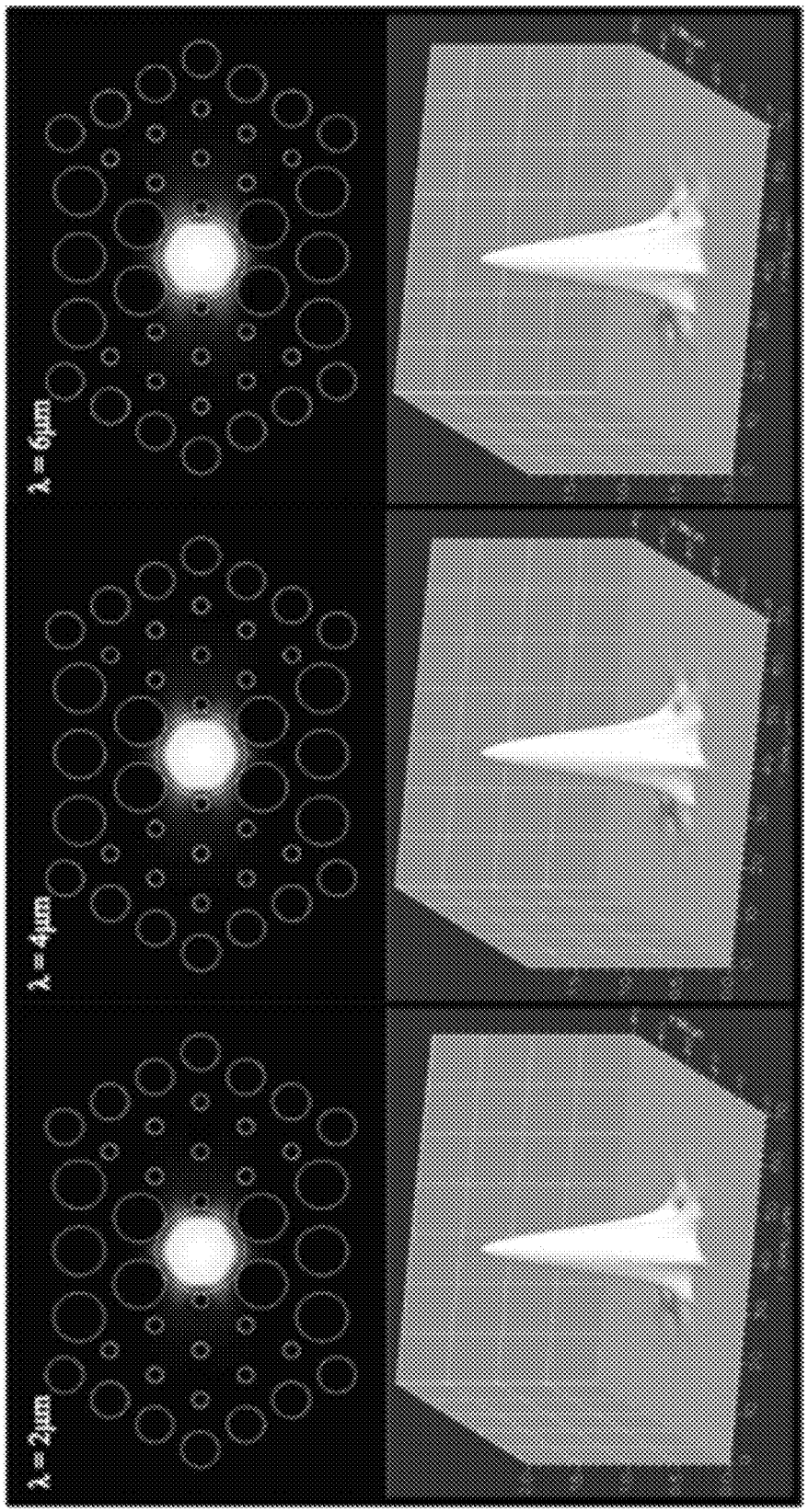
FIG. 8 is the 2D (top) and 3D (bottom) simulations of the fundamental mode in the polarization-maintaining fiber illustrated in FIG. 7.

The simulations show that as the wavelength increases both the leakage loss and birefringence increases. The loss is in the order of $10^{-5}$ dB/km on the short wavelength edge and in the order of $10^{-2}$ dB/km in the long wavelength edge, both these values are negligible when compared to the material absorption of chalcogenide glasses in the order of ~100 dB/km. The small increase in leakage loss is accompanied by a small decrease in core fill fraction, see FIG. 8, which can be observed in the increasing penetration of the electric field towards the photonic crystal structure with increasing wavelength. The bending loss is <0.5 dB/km up to a bending radius of 12.5 mm.

Figure 9:
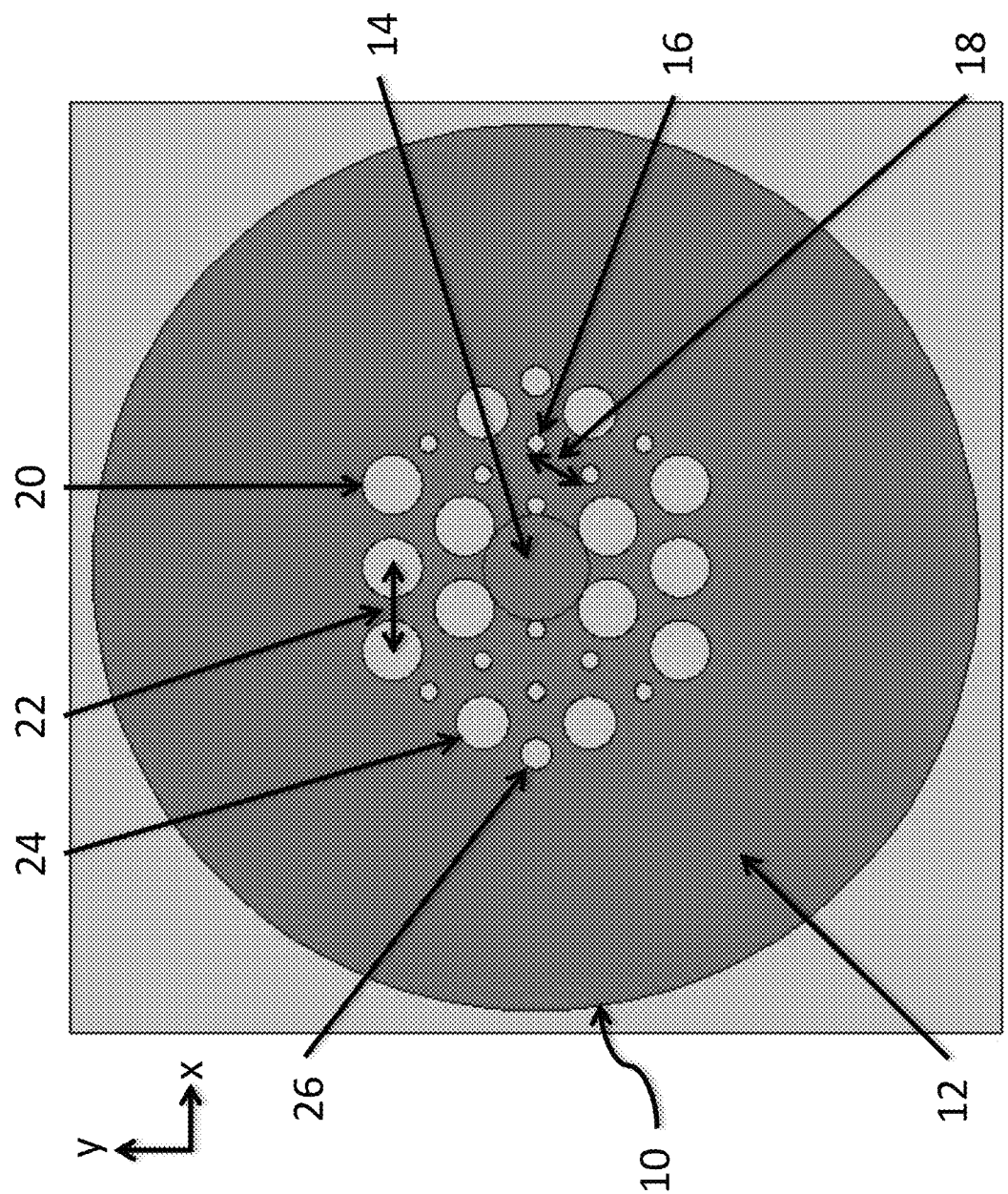
FIG. 9 is a cross-section view showing a structure of a polarization-maintaining fiber.

Yet another exemplary embodiment of PM-PCF 10 is illustrated in FIG. 9. This embodiment further reduces the number of holes and has a better symmetric photonic crystal structure than the PM-PCF 10 illustrated in FIG. 7 with respect to both the x-axis and the y-axis. The photonic crystal structure is essentially the same as in FIG. 7 except in the x-direction where the partial isolation layer is removed and the third layer of small holes 16 is partially replaced by four large holes 24 and two holes 26 smaller than the large holes 24 but larger than the small holes 16. The birefringence is the same as in FIG. 7 but the lower number of holes and the improved symmetry, i.e., the photonic crystal holes are distributed in a more circular pattern, facilitate the fabrication process.

Example 2

Another exemplary chalcogenide PM-PCF embodiment, illustrated in FIG. 9, was simulated for the mid-wave infrared spectrum (2-6 micron) transmission with low loss (<200 dB/m) and high birefringence (~$10^{-4}$). Also, the PM-PCF has a large circular core 14 with a diameter of 11.9 μm capable of delivering high power laser light. The chalcogenide-based single mode PM-PCF design consist of a region along the x-direction with 2 layers of holes 16 having a diameter of 2.1 μm, period 18 of 7 μm, ratio of 0.3, and a partial isolation layer with a mix of small holes 16 having a diameter of 2.1 μm, large holes 24 having a diameter of 6 μm, and medium holes 26 having a diameter of 3.5 μm. The region in the y-direction has 2 layers of holes 20 having a diameter of 6.8 μm, period 22 of 9.35 μm, and ratio of 0.7273. This PM-PCF design is optimized to have a large core with large mode area for optimization of its power handling at all wavelengths of interest, low loss propagation, single mode guidance in the wavelength range from 2 μm to 6 μm, high birefringence, and improved circularity.

The simulations of the PM-PCF reveal negligible losses in the 2 μm to 6 μm wavelength range <2.3 dB/km. The core fill fraction, i.e., how much light is in core 14, decreases at longer wavelength but the design keeps more than 96.86% of the power in the core region for all wavelengths. Lastly, the birefringence increases with wavelength going from $0.2 \times 10^{-4}$ up to $6.2 \times 10^{-4}$. The circularity was improved (short radius/long radius >0.99) providing a fairly circular output beam. Table 2 summarizes the optical performances of the chalcogenide PM-PCF design in FIG. 9 with the above dimensions.

TABLE 2

Optical performance for the chalcogenide PM-PCF in Design in FIG. 9 according to example 2.

| Wavelength | Birefringence | Fill fraction | Loss (dB/km) | Circularity |
|---|---|---|---|---|
| 2 μm | $0.2 \times 10^{-4}$ | 98.12% | 0.017 | 0.9922 |
| 3 μm | $0.8 \times 10^{-4}$ | 97.89% | 0.062 | 0.9958 |
| 4 μm | $1.8 \times 10^{-4}$ | 97.62% | 0.210 | 0.9997 |
| 5 μm | $3.6 \times 10^{-4}$ | 97.29% | 0.717 | 0.9961 |
| 6 μm | $6.2 \times 10^{-4}$ | 96.86% | 2.284 | 0.9911 |

Figure 10:
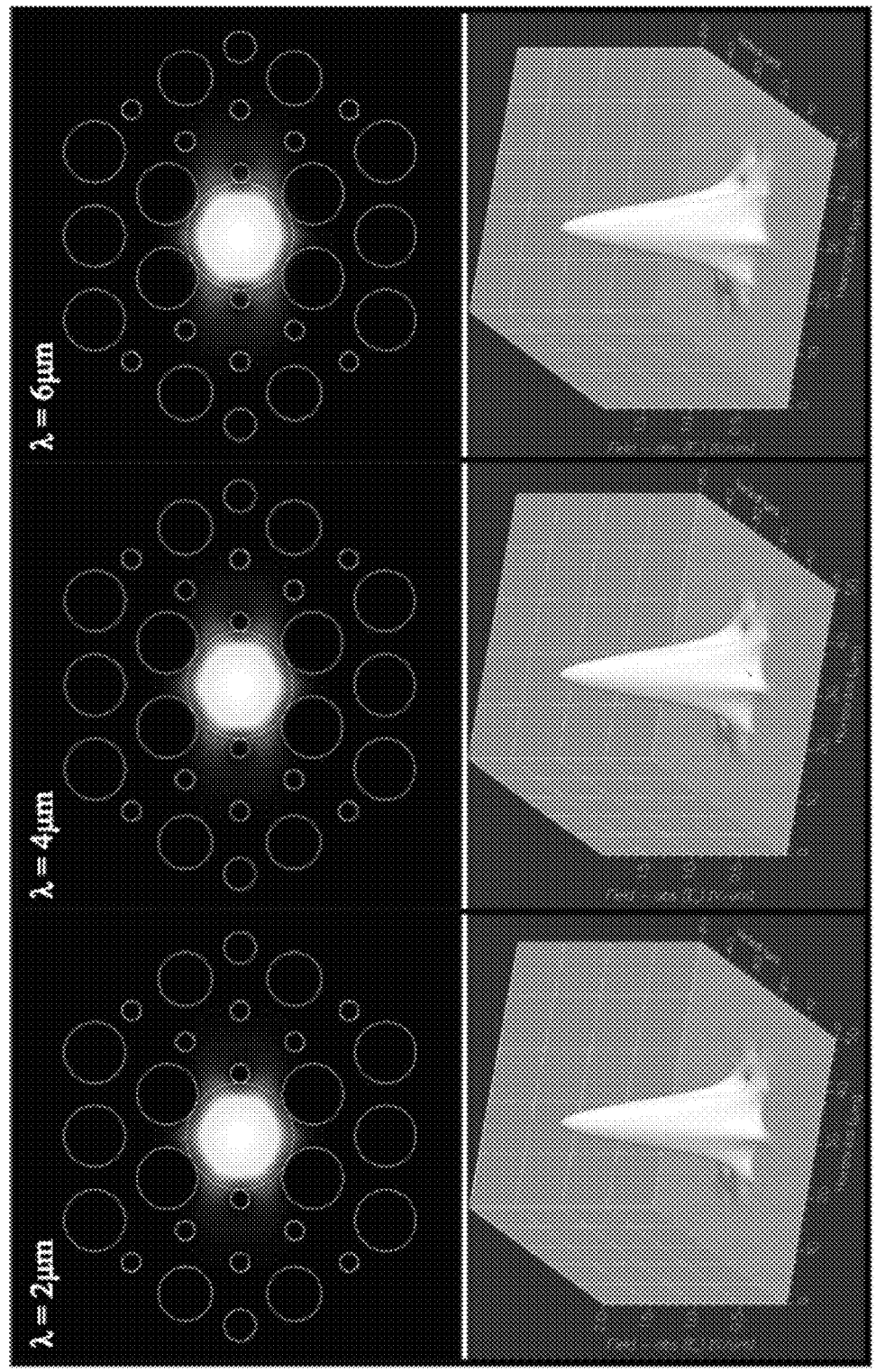
FIG. 10 is the 2D (top) and 3D (bottom) simulations of the fundamental mode in the polarization-maintaining fiber illustrated in FIG. 9.

The simulations show that as the wavelength increases both the leakage loss and birefringence increases. The loss is in the order of $10^{-2}$ dB/km on the short wavelength edge and in the order of 2.3 dB/km in the long wavelength edge, yet each of these values is negligible when compared to the material absorption of chalcogenide glasses in the order of ~100 dB/km. The small increase in leakage loss is accompanied by a small decrease in core fill fraction, see FIG. 10, which can be observed in the increasing penetration of the electric field towards the photonic crystal structure with increasing wavelength. The bending loss is <0.5 dB/km up to a bending radius of 15 mm.

The above-mentioned PM-PCF embodiments, including those illustrated in FIGS. 5A, 5B, 6, 7, and/or 9, can facilitate the collimation of the output-polarized laser light with good beam quality and brightness over long distances. Because polarized light is reflected or absorbed differently in materials depending on its orientation, guiding polarized light in these PM-PCFs can enable new applications due to the unique properties of these PM-PCFs. An optical device comprising an exemplary PM-PCF can be used to transmit polarized light in the following exemplary and non-exhaustive applications/systems: LIDAR/LADAR (Light/Laser Detection and Ranging) systems, advanced driver assistance systems (ADAS), chemical sensing systems, medical laser systems for selective tissue ablation and cauterization, spectroscopy systems, broadband laser beam delivery systems, and/or mid-infrared transmission systems.

The above-mentioned PM-PCF embodiments, including those illustrated in FIGS. 5A, 5B, 6, 7, and/or 9, appear to have their birefringence substantially influenced by the difference in the effective refractive index of the orthogonal pairs of areas of holes surrounding the core. The pair of areas of holes with the larger diameter-to-period ratio seems to produce the lower effective refractive index because of the higher air fill fraction, which produces the fast axis. The orthogonal pair of areas of holes with the smaller diameter-to-period ratio produces the higher effective refractive index because of the smaller air fill fraction, which produces the slow axis. The period of the holes along the fast axis is different from the period of holes along the slow axis. One can imagine other PM-PCF designs by varying the attributes, e.g., shapes, positions, orientations, dimensions, and/or periods, etc., of the holes along the fast axis and/or varying the attributes, e.g., shapes, positions, orientations, dimensions, and/or periods, etc., of holes along the slow axis. The combinations and/or ratios of different holes' attributes along both orthogonal axes can be optimized in numerous ways to produce high birefringence, low transmission loss, and/or circular core.

Certain exemplary embodiments, such as certain embodiments described and/or illustrated herein, can have complex asymmetric orthogonal patterns of holes with different attributes, e.g., periods and dimensions. That is, the symmetric regions of holes located on either side of the x-axis can be different (asymmetric) to the symmetric regions of holes located on either side of the y-axis (orthogonal to the x-axis). Yet the change of periods in the patterns of holes with different dimensions of holes can make it extremely challenging, laborious, and/or time-consuming to use the stacking of hexagonal arrays of glass capillaries to precisely produce the PM-PCF preform with multiple periodicities between capillaries.

Glass extrusion is potentially a better approach for precisely making the above-mentioned complex PM-PCF preforms in a single step. Soft glass has a low melting temperature, <800° C., and can be extruded into rods and/or tubes of various shapes. Soft glasses include infrared glasses such as chalcogenide, fluoride, and tellurite, for example. Certain exemplary embodiments can employ high-purity chalcogenide glasses to help with low-loss infrared fiber transmission, such as those glasses and manufacturing processes described in United States Patent Publication 2014/0245794, titled "Manufacturing process for chalcogenide glasses", which is incorporated herein by reference in its entirety. Certain exemplary embodiments can employ $As_2S_3$ chalcogenide glass for fiber transmission for infrared waves having a wavelength range falling between approximately 1.5 to approximately 6 microns. Certain exemplary embodiments can employ $As_2S_3$ chalcogenide glass for fiber transmission for infrared waves having a wavelength range falling between approximately 2 to approximately 10 microns.

An extrusion process can be used to produce the PM-PCF glass preform. The glass extruder can have a vertical configuration and/or can comprise a piston, tooling die, glass billet sleeve, high-temperature oven, rail traverse system, and/or computerized/automated control system. The piston can be attached to a high-force ball jackscrew actuated by a stepper motor (or precision AC Servo motor) and configured to raise or lower the piston at a precise speed and/or to precisely position the piston. The transmission on the jackscrew can enable a feed rate (piston speed) range falling between <0.0001 meters per hour to >2 meters per hour (±0.0001 resolution). A load cell can measure the force between the piston and the ball jackscrew. The load cell can be adjusted to limit the maximum feed force to 500 kg for stopping the extrusion. A heat shield can protect the load cell from the oven. The die can be designed and/or machined to extrude the PM-PCF preform with the asymmetric orthogonal groups of holes as described herein. The die can be placed into the die holder, which can sit on the top of a shelf below the extruder. The glass billet can be placed into the sleeve (cylinder) along with a piston cap. The inside diameter range of the sleeve can fall between approximately 25 mm to approximately 51 mm. The sleeve assembly can be placed on the die holder with the oven raised. The sleeve, die, and/or piston cap can be made of one or more metals such as stainless steel, titanium alloy, aluminum alloy, and/or Inconel, for example. The oven can be lowered onto the tooling via a pneumatic cylinder with hydraulic speed control. The oven can include one or more heating elements, such as heating tapes, resistive elements, and/or ceramic rings, for example. The oven can have multiple zones and/or thermocouples, such as one at the die position, and one at the upper zone. The oven can be capable of operating at a temperature range falling within approximately 300° C. to approximately 1100° C. ((±1.0° C.). The oven temperature control system (which can be made by, e.g., Eurotherm of Ashburn, Va.) can provide the temperatures control and/or readout. The oven temperature can be adjusted to melt the soft glass to the desired viscosity range falling between approximately $10^{11}$ to approximately $10^6$ Pa-sec. Lower oven temperatures can result in a higher viscosity and/or a higher load on the piston pushing on the soft glass, while higher temperatures can produce a lower viscosity and/or a lower load. The range of load for soft glass extrusion can be between approximately 30 kg and approximately 500 kg. The extruded glass coming out of the die can be held with the help of a chuck on the rail traverse system. The draw rate (rail traverse speed) can be actuated by a stepper motor (or precision AC Servo motor) to lower the chuck holding the extruded glass at a precise speed and/or to a precise position. The draw rate range can be between approximately 0.01 meters per hour to approximately 60 meters per hour ((±0.001 mph resolution). A load cell can measure the pull force exercised on the chuck. The maximum pull force can be set to approximately 50 kg. The maximum draw length can be approximately 1200 mm. The feed and draw speeds can be calculated and/or adjusted based on the volume of glass coming in (feed) and/or the volume of the glass coming out (draw).

Figure 11:
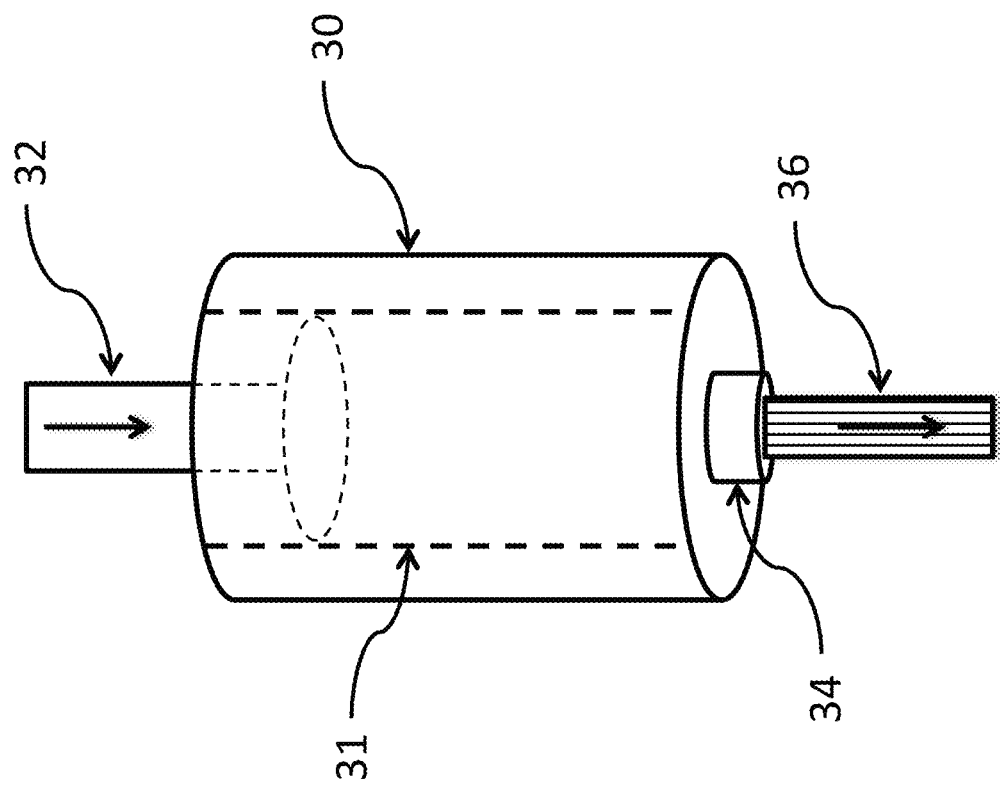
FIG. 11 is a schematic illustration of the extrusion of the preform for a polarization-maintaining fiber.

The soft glass can be extruded through the die to form the PM-PCF preform, with pin attributes of the die imposing hole attributes on the extruded soft glass. FIG. 11 illustrates an exemplary soft glass extrusion process configured to precisely produce the PM-PCF preform with the complex asymmetric orthogonal patterns of holes with different attributes, e.g., periods and/or dimensions. The soft glass billet can be inserted in a sleeve or cylinder 31 inside an oven 30. The piston 32 can enter the sleeve to push the soft glass through the complex die 34 to produce the extruded PM-PCF preform 36.

The diameter of the extruded PM-PCF preform 36 need not extend much past the last layers of holes. Thus, the fiber draw of the extruded PM-PCF preform 36 directly into a fiber could result a very small outer diameter of ~40 μm, which could result in an extremely thin and/or fragile fiber. One solution can be to use a tube to over-clad the extruded PM-PCF preform 36 to increase the thickness of the jacket 12 surrounding the photonic crystal holes. The extruded PM-PCF preform 36 can be pulled into a PM-PCF cane 40 of few mm (e.g., within a range falling within approximately 2 mm to approximately 5 mm) in diameter to be manually slid into the over-clad tube, the outside diameter of the cane approximately 1 mm to 2 mm smaller that the inside diameter of the tube. The ratios and geometry of the asymmetric orthogonal patterns of holes in the extruded PM-PCF preform 36 can be proportionally (with respect to both the x-axis and the y-axis) transferred in the pulled PM-PCF cane 40, with a goal of reducing the dimensions of the cane proportionally to the dimensions of the extruded preform. For example, if the cane diameter is 4 times smaller than the preform diameters, the holes dimensions and periods in the cane can be 4 times smaller than the ones in the preform. The pulling of the preform into the cane can be done at low temperature, within a range of approximately 100° C. to approximately 200° C. higher than the glass transition temperature, in order to have high glass viscosity and/or to preserve the ratios and geometries as much as possible.

Figure 12:
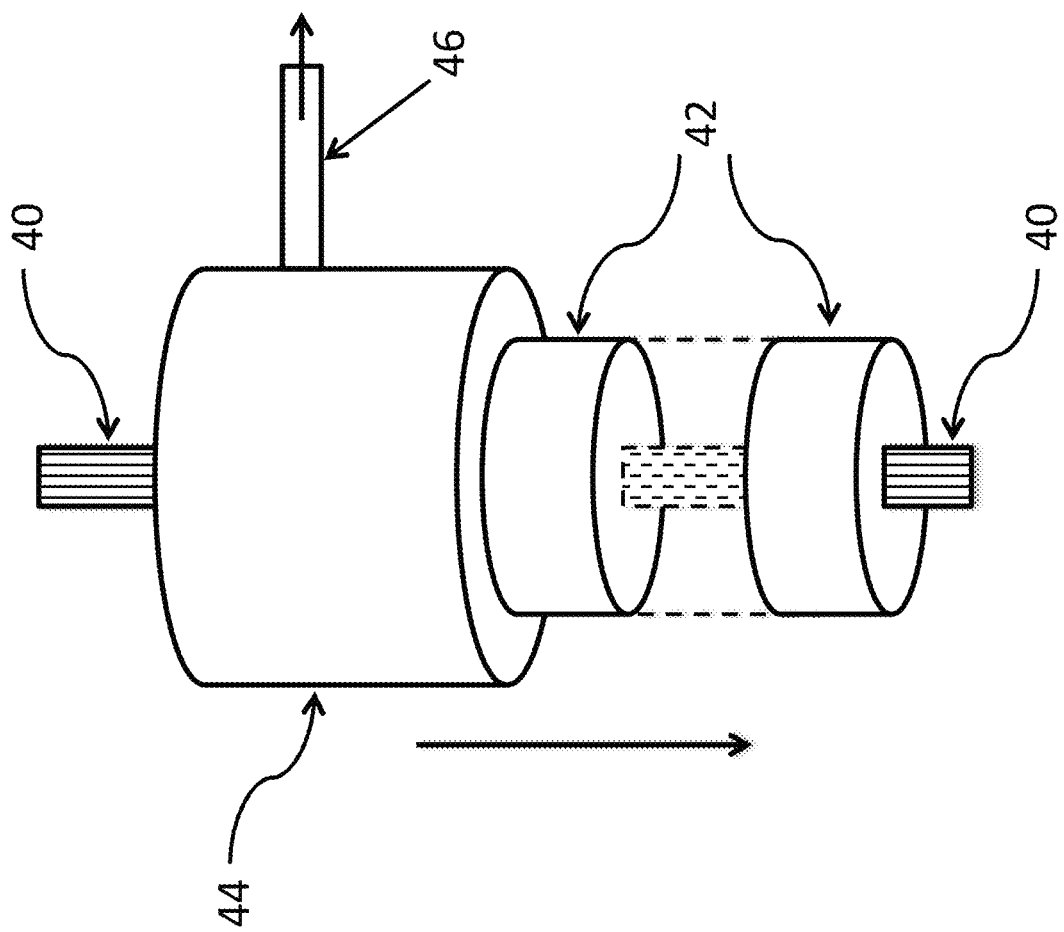
FIG. 12 is a schematic illustration of the fabrication of a polarization-maintaining fiber.

FIG. 12 illustrates an exemplary fiber draw process for the PM-PCF. The PM-PCF cane 40 can be inserted inside a thick over-clad tube 42. The tube can be extruded or cast from the same soft glass material as the cane. The PM-PCF cane 40 and the over-clad tube 42 can be held, such as with heat shrink tubes or Teflon tapes, at the top end by a sleeve/cylinder 44 made of metal or glass. The bottom end of the PM-PCF cane 40 and the over-clad tube 42 can be sealed, such as with heat shrink tubes or Teflon tapes. The bottom of the cylinder 44 can be sealed, such as with heat shrink tubes or Teflon tapes, around the over-clad tube 42 and the top of the cylinder 44 can be sealed in the same way around the PM-PCF cane 40. The cylinder 44 can be substantially evacuated, such as with a scroll vacuum pump, through an opening 46. The cylinder 44 can be moved downward, such as via a preform feed, to insert the bottom of the PM-PCF cane 40 and the over-clad tube 42 inside the fiber draw furnace. The partial to full vacuum in the cylinder 44 can collapse and seal the over-clad tube 42 around the PM-PCF cane 40 inside the furnace during the fiber draw process. That is, because of the furnace heat, the over-clad tube can soften and the vacuum suction can collapse the tube over the cane 40. The vacuum seal between the cane 40 and the tube 42 can prevent voids and/or trapped air that might enter with the collapse. The top of the PM-PCF cane 40 either can be left open to atmospheric pressure or connected, such as to an inert gas pressure system, with a flexible tube to apply pressure, at a range falling within approximately 1 to approximately 50 mbar, inside the photonic crystal holes, which can help control the dimensions of the holes during the PM-PCF draw.

Figure 13:
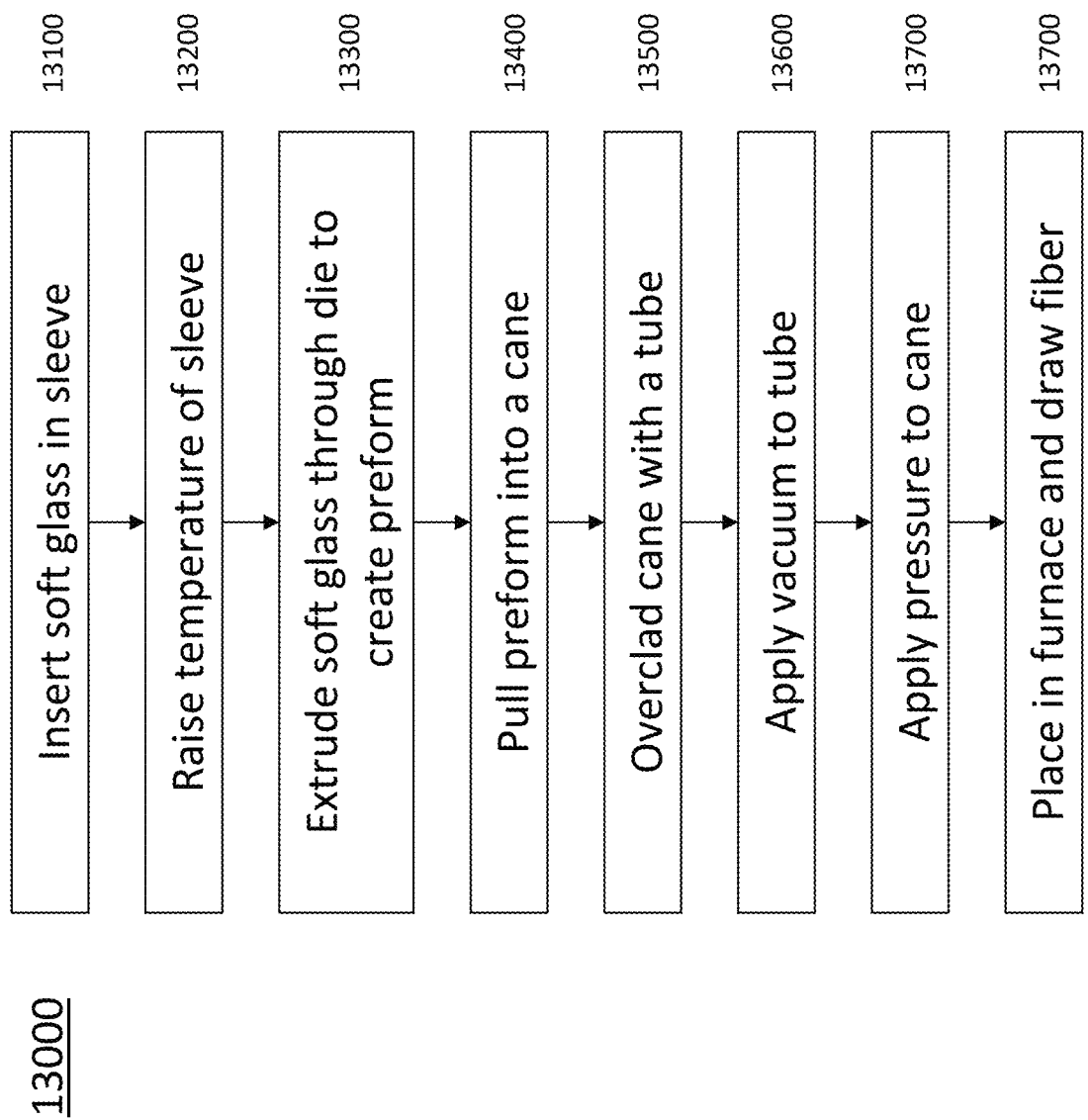
FIG. 13 is a flowchart of an exemplary embodiment of a method.

FIG. 13 is a flowchart of an exemplary embodiment of a method 13000. At activity 13100, soft glass can be inserted into a sleeve. At activity 13200, the temperature of the sleeve can be raised to and/or at a desired temperature. At activity 13300, the soft glass can be extruded through a complex die to create a preform, pin attributes of the die imposing hole attributes on the extruded soft glass. At activity 13400, the preform can be pulled into a cane. At activity 13500, the cane can be over-clad with a tube. At activity 13600, a vacuum can be applied to the tube. At activity 13700, a pressure can be applied to the cane. At activity 13800, the tube preform can be placed in a furnace and a fiber can be drawn from it.

Certain exemplary embodiments can provide a polarization-maintaining photonic crystal fiber comprising:
an elongated guiding core; and/or
an elongated photonic crystal cladding surrounding the core;
wherein:
a cross-sectional area of the fiber taken orthogonally to a fiber longitudinal axis of the fiber characterized by an x-axis and a y-axis, the x-axis orthogonal to the y-axis, the x-axis and the y-axis orthogonal to the longitudinal axis;
the cross-sectional area of the fiber defines a collection of groups of elongated holes located in the cladding, each hole in the collection having a hole longitudinal axis that is parallel to the fiber longitudinal axis, the collection of groups comprising a first group, a second group, a third group, and a fourth group, the first and third group defining an opposing first pair, the second and fourth group defining an opposing second pair;
the first group and the third group are symmetrical with each other with respect to the x-axis or the y-axis;
a first plurality of the holes in the first group have a first period and/or a first common dimension;
the second group and the fourth group are symmetrical with each other with respect to the x-axis or the y-axis;
a first plurality of the holes in the second group have a first period and/or a first common dimension;
a difference in the first period and/or the first dimension of the first plurality of the holes in the first group with respect to the first period and/or first common dimension of the first plurality of the holes in the second group is configured to generate a predetermined birefringence in the polarization-maintaining photonic crystal fiber;
the fiber is single mode;
a guided mode of the fiber has a circularity (short radius/long radius) of greater than 0.95;
the birefringence is greater than 10-5;
a transmission loss of the fiber is less than 1000 dB/km;
the holes of the groups of the collection have any of a variety of closed shapes;
the collection of groups comprises a fifth group of elongated holes having a different common dimension than the respective common dimensions of the holes of the first group, second group, third group, or fourth group, the fifth group surrounding the opposing first pair and/or the opposing second pair, the fifth group configured to decrease a leakage loss of the fiber;
the collection of groups comprises a fifth group of elongated holes having a different period than the holes of the first group, second group, third group, or fourth group, the fifth group surrounding the opposing first pair and/or the opposing second pair, the fifth group configured to decrease a leakage loss of the fiber;
the fiber is made of a single glass material;
the fiber is made of a soft glass having a melting temperature of less than 800 C;
the x-axis and y-axis define four Cartesian quadrants comprising a first quadrant, a second quadrant, a third quadrant, and a fourth quadrant, each of the four Cartesian quadrants including a corresponding plurality of quadrant holes, the quadrant holes of the first quadrant symmetrical about the y-axis with the quadrant holes of the second quadrant, the quadrant holes of the second quadrant symmetrical about the x-axis with the quadrant holes of the third quadrant, and the quadrant holes of the third quadrant symmetrical about the y-axis with the quadrant holes of the fourth quadrant;
a second plurality of holes in the first group have a second period and/or a second common dimension, the first period of the first group differing from the second period of the first group and/or the first common dimension of the first group differing from the second common dimension of the first group;
a second plurality of holes in the second group have a second period and/or a second common dimension, the first period of the second group differing from the second period of the second group and/or the first common dimension of the second group differing from the second common dimension of the second group;
a second plurality of holes in the first group have a shape that differs from a shape of the first plurality of holes in the first group;
with respect to the x-axis and/or the y-axis, a second plurality of holes in the first group have an orientation that differs from an orientation of the first plurality of holes in the first group;

the fiber is comprised in a system selected from the group consisting of:
a LIDAR (Light Detection and Ranging) system;
a LADAR (Laser Detection and Ranging) system;
an advanced driver assistance system (ADAS);
a medical laser system;
a chemical sensor system;
a spectroscopy system;
a broadband laser beam delivery system; and/or
a mid-infrared transmission system.

Certain exemplary embodiments can provide a method for forming a single mode polarization-maintaining photonic crystal fiber that comprises an elongated guiding core and/or an elongated photonic crystal cladding surrounding the core, the cladding defining a first plurality of elongated holes defined by a first hole period and a first hole diameter and/or a second plurality of elongated holes defined by second hole period and/or a second hole diameter, the method comprising:

extruding a soft glass through a die to form a preform for the fiber, the die having a first plurality of pins defined by a first pin period and/or a first pin diameter and/or a second plurality of pins defined by second pin period and/or a second pin diameter;
pulling the preform into a cane;
over-cladding at least a portion of the cane;
heating a tube that overlaps a portion of a cane pulled from the preform; and/or
drawing a fiber from the tube and the portion of the cane.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
after—following in time and/or subsequent to.
along—through, on, besides, over, in line with, and/or parallel to the length and/or direction of; and/or from one end to the other of.
and—in conjunction with.
and/or—either in conjunction with or in alternative to.
any—one, some, every, and/or all without specification.
apparatus—an appliance or device for a particular purpose.
approximately—about and/or nearly the same as.
are—to exist.
area—a surface with determinable boundaries; and/or the measure of the space within a 2-dimensional region.
around—about, surrounding, and/or on substantially all sides of; and/or approximately.
as long as—if and/or since.
associate—to join, connect together, and/or relate.
at—in, on, and/or near.
at least—not less than, and possibly more than.
axis—a straight line about which a body and/or geometric object rotates and/or can be conceived to rotate and/or a center line to which parts of a structure and/or body can be referred.
based on—indicating one or more factors that affect a determination, but not necessarily foreclosing additional factors that might affect that determination.
beam—a stream of photons moving in the same general direction.
between—in a separating interval and/or intermediate to.
birefringence—dividing a ray of light into two unequally refracted polarized rays (known as the ordinary and extraordinary rays), the directions of polarization of the rays being at right angles to each other; double refraction;
broadband—within a frequency band of approximately 10 KHz to approximately 1 GHz, including all values and subranges therebetween.
by—via and/or with the use and/or help of
can—is capable of, in at least some embodiments.
cane—a temporary shape into which a preform can be formed (e.g., extruded and/or drawn) before being further processed (e.g., by further drawing) into an optical fiber.
Cartesian—relating to a system in which numbers indicate the location of a point relative to a fixed reference point (the origin), being its shortest (perpendicular) distances from two fixed axes (or three planes defined by three fixed axes) that intersect at right angles at the origin.
cause—to bring about, provoke, precipitate, produce, elicit, be the reason for, result in, and/or effect.
chemical—of or relating to chemistry and/or chemicals.
circularity—the ratio of short radius to long radius of a 2-dimensional substantially elliptical shape.
cladding—a covering or coating on a structure or material.
closed—the result of closing, having boundaries, and/or enclosed.
collection—a plurality.
common—shared and/or same.
composition of matter—a combination, reaction product, compound, mixture, formulation, material, and/or composite formed by a human and/or automation from two or more substances and/or elements.
comprising—including but not limited to.
conceive—to imagine, conceptualize, form, and/or develop in the mind.
configure—to design, arrange, set up, shape, and/or make suitable and/or fit for a specific purpose, function, use, and/or situation.
configured to—designed, arranged, set up, shaped, and/or made suitable and/or fit for a specific purpose, function, use, and/or situation, and/or having a structure that, during operation, will perform the indicated activity(ies). To the extent relevant to the current application, the use of "configured to" is expressly not intended to invoke 35 U.S.C. § 112(f) for that structure.
connect—to join or fasten together.
consisting—including only.
containing—including but not limited to.
convert—to transform, adapt, and/or change.

core—a substantially innermost and/or central, and potentially removable, object around which another material will be placed, cast, formed, and/or drawn.

corresponding—related, associated, accompanying, similar in purpose and/or position, conforming in every respect, and/or equivalent and/or agreeing in amount, quantity, magnitude, quality, and/or degree.

coupleable—capable of being joined, connected, and/or linked together.

coupling—linking in some fashion.

create—to bring into being.

cross-section—a section formed by a plane cutting through an object at a right angle to an axis.

crystal—a solid substance whose atoms are arranged with periodic geometric regularity, called a lattice; a homogenous solid formed by a repeating, three-dimensional pattern of atoms, ions, or molecules and having fixed distances between constituent parts; and/or a single grain or mass of a crystalline sub stance.

dB—decibel.

decrease—to be smaller in magnitude.

define—to establish the meaning, relationship, outline, form, and/or structure of; and/or to precisely and/or distinctly describe and/or specify.

delivery—an act of conveying and/or transferring.

derive—to receive, obtain, and/or produce from a source and/or origin.

detection—an act of sensing or perceiving.

determine—to find out, obtain, calculate, decide, deduce, ascertain, and/or come to a decision, typically by investigation, reasoning, and/or calculation.

device—a machine, manufacture, and/or collection thereof.

diameter—a length of a straight line segment passing through a center of an object and terminating at the periphery thereof.

die—a tool of metal, silicon carbide, and/or other hard material having one or more holes through which elongated structures, such as wires, rods, and/or tubes, are drawn to reduce their diameter.

differ—to be different, changed, distinct, and/or separate from.

difference—a value obtained via a subtraction of a first quantity from a second quantity; and/or a point of unlikeness and/or dissimilarity.

different—changed, distinct, and/or separate.

dimension—an extension in a given direction and/or a measurement in length, width, or thickness.

each—every one of a group considered individually.

effective—sufficient to bring about, provoke, elicit, and/or cause.

elongated—drawn out, made spatially longer, and/or having more length than width.

embodiment—an implementation, manifestation, and/or concrete representation.

estimate—(n) a calculated value approximating an actual value; (v) to calculate and/or determine approximately and/or tentatively.

exemplary—serving as an example, instance, and/or illustration.

extrude—to shape a material by forcing it through a die.

fiber—a slender, elongated structure of relatively small, uniform diameter having a much greater length, which may have a relatively short finite length or an indeterminate length.

first—a label for a referenced element in one or more patent claims, but that label does not necessarily imply any type of ordering to how that element (or any other elements of a similar type) is implemented in embodiments of the claimed subject matter.

for—with a purpose of.

form—to make, produce, create, generate, construct, and/or shape.

from—used to indicate a source, origin, and/or location thereof.

further—in addition.

generate—to create, produce, render, give rise to, and/or bring into existence.

given—predetermined and/or specific.

glass—an inorganic product (a) the constituents of which generally include a glass former (e.g., $As_2O_3$, $B_2O_3$ $GeO_2$, $P_2O_5$, $SiO_2$, $V_2O_5$, chalcogenide, fluoride, and/or tellurite, etc.) which has an essential characteristic of creating and/or maintaining, singly, and/or in a mixture, that type of structural disorder characteristic of a glassy condition, other oxides that approach glass forming properties (e.g., $Al_2O_3$, $BeO$, $PbO$, $Sb_2O_3$, $TiO_2$, $ZnO$, and/or $ZrO_2$, etc.) and/or as oxides that are practically devoid of glass forming tendencies (e.g., $BaO$, $CaO$, $K_2O$, $Li_2O$, $MgO$, $Na_2O$, and/or $SrO$, etc.), however, pure and modified silica, silicon, and slag are also included; (b) that is formed by fusion and cooled to a rigid condition generally without crystallization; (c) that has no definite melting point (whereby the mass has the characteristic of passing through a plastic state before reaching a liquid state when heated); (d) that is incapable in the solid state of permanent deformation; and/or (e) that fractures when subject to deformation tension.

glass fiber—a thin flexible fiber with a glass core through which light signals can be sent with very little loss of strength.

greater than—larger and/or more than.

group—(n.) a number of individuals or things considered together, possibly because of similarities; (v.) to associate a number of individuals or things such that they are considered together and/or caused to have similar properties.

guide—(v) to direct, steer, and/or exert control and/or influence over.

guided mode—in an optical waveguide, a mode whose field decays monotonically in the transverse direction everywhere external to the core and which does not lose power to radiation. Also called bound mode.

have—to possess as a characteristic, quality, or function.

having—possessing, characterized by, comprising, and/or including, but not limited to.

heating—transferring energy from one substance to another resulting in an increase in temperature of one substance.

hole—an aperture that extends through its object and/or defines a substantially constant cross-sectional shape along its longitudinal axis.

including—having, but not limited to, what follows.

initialize—to prepare something for use and/or some future event.

install—to connect or set in position and prepare for use.

into—to a condition, state, or form of is—to exist in actuality.

km—kilometer.

laser—a source of high-intensity optical, infrared, or ultraviolet radiation produced as a result of stimulated emission maintained within a solid, liquid, or gaseous medium, whereby the photons involved in the emission process all have the same energy and phase so that the laser beam is monochromatic and coherent, allowing it to be brought to a fine focus; and/or any similar source producing a beam of any electromagnetic radiation, such as infrared or microwave radiation.

leakage—a loss and/or undesired leakage, such as of photons.

less than—having a measurably smaller magnitude and/or degree as compared to something else.

LIDAR—equipment and/or methods for measuring distances by illuminating the target with laser light and measuring the reflection with a sensor, whereby differences in laser return times and wavelengths can then be used to make digital 3-D representations of the target.

light—optical wavelengths, i.e., that part of the spectrum extending from the near infrared, through the visible, to the ultraviolet, but also includes those portions of the spectrum that extend from the near infrared through the long wavelength, far infrared, and from the ultraviolet to X-rays and gamma rays at the shortest wavelengths.

located—situated in a particular spot, region, and/or position.

long—of relatively more than a reference; extending and/or traveling a relatively greater distance than another.

longitudinal—of and/or relating to a length; placed and/or running lengthwise.

longitudinal axis—a straight line defined parallel to an object's length and passing through a centroid of the object.

loss—a decline in amount and/or activity.

made—produced, generated, and/or performed.

maintain—to retain, preserve, sustain, keep in an existing state, and/or continue to obtain.

material—a substance and/or composition.

may—is allowed and/or permitted to, in at least some embodiments.

medical—of or relating to the study or practice of medicine.

melt—to be changed from a solid to a liquid state, especially by the application of heat; to soften; and/or to cause to flow.

method—one or more acts that are performed upon subject matter to be transformed to a different state or thing and/or are tied to a particular apparatus, said one or more acts not a fundamental principal and not pre-empting all uses of a fundamental principal.

mid-infrared—having and/or relating to light and/or radiation having a wavelength ranging from approximately 3 μm to approximately 5 μm.

mode—in a waveguide or cavity, one of the various possible patterns of propagating or standing electromagnetic fields. Each mode is typically characterized by angle, frequency, polarization, electric field strength, and/or magnetic field strength. For example, when a pulse of light is transmitted through an optical fiber, the energy can follow a number of paths that cross the fiber's longitudinal axis at different angles. A group of paths that cross the axis at the same angle is known as a mode.

no—an absence of and/or lacking any.

non-destructively—to perform substantially without damaging.

one—being and/or amounting to a single unit, individual, and/or entire thing, item, and/or object.

operable—practicable and/or fit, ready, and/or configured to be put into its intended use and/or service.

operative—when in operation for its intended use and/or service.

opposing—opposite; against; being the other of two complementary and/or mutually exclusive things; placed and/or located opposite, in contrast, in counterbalance, and/or across from something else and/or from each other.

or—a conjunction used to indicate alternatives, typically appearing only before the last item in a group of alternative items.

orientation—a location and/or position relative to something else.

orthogonal—perpendicular and/or at right angles.

other—a different and/or distinct entity and/or not the same as already mentioned and/or implied.

outside—beyond a range, boundary, and/or limit; and/or not within.

over-clad—(v) to provide and/or apply a secondary and/or additional cladding.

overlap—to extend over and cover a part of.

pair—a quantity of two of something.

parallel—of, relating to, and/or designating lines, curves, planes, and/or surfaces everywhere equidistant.

per—for each and/or by means of.

period—a time interval.

perpendicular—intersecting at or forming substantially right angles.

photon—the elementary particle of light and other electromagnetic radiation; the quantum of electromagnetic energy. The photon is the massless, neutral vector boson that mediates electromagnetic interactions.

photonic—the branch of technology concerned with the properties and transmission of photons, for example, in fiber optics.

pin—a slender, sometimes cylindrical member.

plurality—the state of being plural and/or more than one.

polarization—(definition 1) in a beam of polarized electromagnetic radiation, the polarization direction is the direction of the electric field vector (with no distinction between positive and negative as the field oscillates back and forth). The electric field vector is always in the plane which is normal to the beam propagation direction. At a given stationary point in space, the electric field vector of a beam can vary with time at random (unpolarized beam), can remain constant (plane-polarized beam), or can rotate. In the latter two cases, the beam is said to be "polarized" and can be thought of as the resultant vector of two orthogonal component vectors having equal amplitudes. If the phase difference of the two component vectors is 0 degrees, the light is plane polarized; if 90 degrees, the light is circularly polarized; and if it is between 0 and 90 degrees, the light is elliptically polarized. Elliptical and plane polarized light can be converted into each other by means of birefringent optical systems which retard one of the orthogonal component vectors relative to the other.

polarization—(definition 2) and/or, that property of a radiated electromagnetic wave describing the time-varying direction and amplitude of the electric field vector; specifically, the figure traced as a function of time by the extremity of the vector at a fixed location in space, as observed along the direction of propagation. Typically, the figure is elliptical and is traced in a clockwise or counterclockwise sense. The commonly referenced circular and linear polarizations are obtained when the ellipse becomes a circle or a straight line, respectively. Clockwise sense rotation of the electric vector is designated right-hand polarization and counterclockwise sense rotation is designated left-hand polarization.

portion—a part, component, section, percentage, ratio, and/or quantity that is less than a larger whole.

pre-—a prefix that precedes an activity that has occurred beforehand and/or in advance.

predetermine—to determine, obtain, calculate, decide, and/or establish in advance.

preform—an object that has been subjected to preliminary, usually incomplete shaping and/or molding before undergoing additional, complete, and/or final processing.

prevent—to hinder, avert, and/or keep from occurring.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

pull—to draw with force, and/or to remove from a fixed position, to extract, and/or to apply force to so as to cause and/or tend to cause motion toward the source of the force.

quadrant—one of four parts into which a plane is divided by two substantially perpendicular lines.

radius—a distance from an approximate center of an object to a curved boundary of the object.

range—a measure of an extent of a set of values and/or an amount and/or extent of variation.

ratio—a relationship between two quantities expressed as a quotient of one divided by the other.

receive—to get as a signal, take, acquire, and/or obtain.

recommend—to suggest, praise, commend, and/or endorse.

reduce—to make and/or become lesser and/or smaller.

remove—to eliminate, remove, and/or delete, and/or to move from a place or position occupied.

repeat—to do again and/or perform again.

repeatedly—again and again; repetitively.

request—to express a desire for and/or ask for.

respectively—singly in the order designated and/or mentioned.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

second—a label for an element in one or more patent claims, the element other than a "first" referenced element of a similar type, but the label does not necessarily imply any type of ordering to how that "second" element or the "first" element is implemented in embodiments of the claimed subject matter.

select—to make a choice and/or selection from alternatives.

selected—chosen from a plurality of alternatives.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.

sensor—a device used to measure a physical quantity (e.g., temperature, pressure, capacitance, and/or loudness, etc.) and convert that physical quantity into a signal of some kind (e.g., voltage, current, power, etc.). A sensor can be any instrument such as, for example, any instrument measuring pressure, temperature, flow, mass, heat, light, sound, humidity, proximity, position, gap, count, velocity, vibration, voltage, current, capacitance, resistance, inductance, and/or electro-magnetic radiation, etc.

set—a related plurality.

shape—a characteristic surface, outline, and/or contour of an entity.

short—of relatively less than a reference; not long;

single—existing alone and/or consisting of one entity.

soft—not rough, abrasive, or harsh to the touch.

species—a class of individuals and/or objects grouped by virtue of their common attributes and assigned a common name; a division subordinate to a genus.

spectroscopy—the science and practice of using spectrometers and spectroscopes and of analyzing spectra, the methods employed depending on the radiation being examined. The techniques are widely used in chemical analysis and in studies of the properties of atoms, molecules, ions, etc.

store—to place, hold, and/or retain data, typically in a memory.

substantially—to a great extent and/or degree.

support—to bear the weight of, especially from below.

surrounding—to encircle, enclose or confine on all sides, and/or extend on all sides of simultaneously.

symmetrical—possessing or displaying symmetry.

symmetry—the correspondence of the form and arrangement of elements and/or parts on opposite sides of a dividing line and/or plane and/or about a center and/or an axis.

system—a collection of mechanisms, devices, machines, articles of manufacture, processes, data, and/or instructions, the collection designed to perform one or more specific functions.

take—to choose, select, adopt, make, assume, derive, obtain, receive, extract, assume, consider, understand, and/or use.

temperature—a measure of the average kinetic energy of the molecules in a sample of matter, expressed in terms of units or degrees designated on a standard scale.

that—used as the subject or object of a relative clause.

through—across, among, between, and/or in one side and out the opposite and/or another side of to—a preposition adapted for use for expressing purpose.

transform—to change in measurable: form, appearance, nature, and/or character.

transmission—the transfer of a signal, message, quantum of energy, and/or form of intelligence from one location to another.

transmit—to send as a signal, provide, furnish, and/or supply.

treatment—an act, manner, or method of handling and/or dealing with someone and/or something.

tube—an elongated member, such as a pipe, hollow cylinder, or hollow rod-like member having a longitudinal axis and defining a longitudinal cross-section resembling any closed shape such as, for example, a circle, a non-circle such as an oval (which generally can include a shape that is substantially in the form of an obround, ellipse, limacon, cardioid, Cartesian oval, and/or Cassini oval, etc.), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube. A tube can define a wall that is shaped in the form of a simple closed curve and that extends axially, providing a conduit throughout its length.

upon—immediately or very soon after; and/or on the occasion of.

use—to put into service.

variety—the quality or condition of being various and/or varied; diversity via—by way of and/or utilizing.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:
any two or more described substances can be mixed, combined, reacted, separated, and/or segregated;
any described characteristic, function, activity, substance, component, and/or structural element, or any combination thereof, can be specifically included, duplicated, excluded, combined, reordered, reconfigured, integrated, and/or segregated;
any described interrelationship, sequence, and/or dependence between any described characteristics, functions, activities, substances, components, and/or structural elements can be omitted, changed, varied, and/or reordered;
any described activity can be performed manually, semi-automatically, and/or automatically;
any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A polarization-maintaining photonic crystal fiber comprising:
    an elongated guiding core; and
    an elongated photonic crystal cladding surrounding the core;
    wherein:
        a cross-sectional area of the fiber taken orthogonally to a fiber longitudinal axis of the fiber characterized by an x-axis and a y-axis, the x-axis orthogonal to the y-axis, the x-axis and the y-axis orthogonal to the fiber longitudinal axis;
        the cross-sectional area of the fiber defines a collection of groups of elongated holes located in the cladding, each hole in the collection having a hole longitudinal axis that is parallel to the fiber longitudinal axis, the collection of groups comprising a first group [1], a second group [2], a third group [3], and a fourth group [4], the first group [1] and third group [3] defining an opposing first pair, the second group [2] and fourth group [4] defining an opposing second pair;
        the first group [1] and the third group [3] are symmetrical with each other with respect to the x-axis or the y-axis;
        a first plurality [1A] of the holes in the first group [1] have a first adjacent-hole centerpoint distance [1AP] and a first common dimension [1AD];
        the second group [2] and the fourth group [4] are symmetrical with each other with respect to the x-axis or the y-axis;
        a first plurality [2A] of the holes in the second group [2] have a first adjacent-hole centerpoint distance [2AP] and a first common dimension [2AD]; and
        a difference in the first adjacent-hole centerpoint distance [1AP] and the first dimension [1AD] of the first plurality [1A] of the holes in the first group [1] with respect to the first adjacent-hole centerpoint distance [2AP] and the first common dimension [2AD] of the first plurality [2A] of the holes in the second group [2] is configured to generate a predetermined birefringence in the polarization-maintaining photonic crystal fiber.

2. The polarization-maintaining photonic crystal fiber of claim 1, wherein the fiber is single mode.

3. The polarization-maintaining photonic crystal fiber of claim 1, wherein a guided mode of the fiber has a circularity (short radius/long radius) of greater than 0.95.

4. The polarization-maintaining photonic crystal fiber of claim 1, wherein the birefringence is greater than $10^{-5}$.

5. The polarization-maintaining photonic crystal fiber of claim 1, wherein a transmission loss of the fiber is less than 1000 dB/km.

6. The polarization-maintaining photonic crystal fiber of claim 1, wherein the holes of the groups of the collection have any of a variety of closed shapes.

7. The polarization-maintaining photonic crystal fiber of claim 1, wherein the collection of groups comprises a fifth group of elongated holes having a different common dimension than the respective common dimensions of the holes of the first group, second group, third group, or fourth group, the fifth group surrounding the opposing first pair and/or the opposing second pair, the fifth group configured to decrease a leakage loss of the fiber.

8. The polarization-maintaining photonic crystal fiber of claim 1, wherein the collection of groups comprises a fifth group of elongated holes having a different adjacent-hole centerpoint distance than the holes of the first group, second group, third group, or fourth group, the fifth group surrounding the opposing first pair and/or the opposing second pair, the fifth group configured to decrease a leakage loss of the fiber.

9. The polarization-maintaining photonic crystal fiber of claim 1, wherein the fiber is made of a single glass material.

10. The polarization-maintaining photonic crystal fiber of claim 1, wherein the fiber is made of a soft glass having a melting temperature of less than 800C.

11. The polarization-maintaining photonic crystal fiber of claim 1, wherein the x-axis and y-axis define four Cartesian quadrants comprising a first quadrant, a second quadrant, a third quadrant, and a fourth quadrant, each of the four Cartesian quadrants including a corresponding plurality of quadrant holes, the quadrant holes of the first quadrant symmetrical about the y-axis with the quadrant holes of the second quadrant, the quadrant holes of the second quadrant symmetrical about the x-axis with the quadrant holes of the third quadrant, and the quadrant holes of the third quadrant symmetrical about the y-axis with the quadrant holes of the fourth quadrant.

12. The polarization-maintaining photonic crystal fiber of claim 1, wherein a second plurality of holes in the first group have a second adjacent-hole centerpoint distance and/or a second common dimension, the first adjacent-hole centerpoint distance of the first group differing from the second adjacent-hole centerpoint distance of the first group and/or the first common dimension of the first group differing from the second common dimension of the first group.

13. The polarization-maintaining photonic crystal fiber of claim 1, wherein a second plurality of holes in the second group have a second adjacent-hole centerpoint distance and/or a second common dimension, the first adjacent-hole centerpoint distance of the second group differing from the second adjacent-hole centerpoint distance of the second group and/or the first common dimension of the second group differing from the second common dimension of the second group.

14. The polarization-maintaining photonic crystal fiber of claim 1, wherein a second plurality of holes in the first group have a shape that differs from a shape of the first plurality of holes in the first group.

15. The polarization-maintaining photonic crystal fiber of claim 1, wherein, with respect to the x-axis and/or the y-axis, a second plurality of holes in the first group have an orientation that differs from an orientation of the first plurality of holes in the first group.

16. A system comprising the polarization-maintaining photonic crystal fiber of claim 1, wherein the system is selected from the group consisting of:
 a LIDAR (Light Detection and Ranging) system;
 a LADAR (Laser Detection and Ranging) system;
 an advanced driver assistance system (ADAS);
 a medical laser system;
 a chemical sensor system;
 a spectroscopy system;
 a broadband laser beam delivery system; and
 a mid-infrared transmission system.

* * * * *